(12) United States Patent  (10) Patent No.: US 9,026,988 B2
Kawaba  (45) Date of Patent: May 5, 2015

(54) CODE CONVERSION METHOD, APPARATUS, STORAGE MEDIUM AND REQUEST REMAINING TIME RESPONSE METHOD

(75) Inventor: Motoyuki Kawaba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 592 days.

(21) Appl. No.: 13/413,728

(22) Filed: Mar. 7, 2012

(65) Prior Publication Data

US 2012/0260231 A1    Oct. 11, 2012

(30) Foreign Application Priority Data

Apr. 7, 2011    (JP) ................................ 2011-085669

(51) Int. Cl.
*G06F 9/44* (2006.01)
*G06F 11/34* (2006.01)

(52) U.S. Cl.
CPC ............ *G06F 11/3495* (2013.01); *G06F 9/443* (2013.01); *G06F 11/3419* (2013.01); *G06F 11/3452* (2013.01); *G06F 2201/865* (2013.01); *G06F 2201/875* (2013.01); *G06F 2201/88* (2013.01)

(58) Field of Classification Search
USPC .......................... 717/106, 107, 108, 132, 133
See application file for complete search history.

(56) References Cited

U.S. PATENT DOCUMENTS

| | | | |
|---|---|---|---|
| 6,078,956 A * | 6/2000 | Bryant et al. ................. | 709/224 |
| 6,334,210 B1 | 12/2001 | Miura et al. | |
| 6,636,894 B1 * | 10/2003 | Short et al. .................... | 709/225 |
| 6,684,252 B1 * | 1/2004 | Chow ............................ | 709/228 |
| 6,807,575 B1 | 10/2004 | Emaru et al. | |
| 7,212,625 B1 * | 5/2007 | McKenna et ............ | 379/266.01 |
| 7,415,383 B2 | 8/2008 | Nakaike et al. | |
| 7,565,448 B1 * | 7/2009 | Schlesener et al. ........... | 709/242 |
| 7,624,175 B1 * | 11/2009 | Schlesener et al. ........... | 709/224 |
| 7,681,229 B1 * | 3/2010 | Ebrahimi et al. ................. | 726/4 |
| 7,870,245 B2 * | 1/2011 | Butler ............................ | 709/224 |
| 2002/0103931 A1 * | 8/2002 | Mott .............................. | 709/245 |
| 2003/0189722 A1 * | 10/2003 | Yoshikawa .................... | 358/1.15 |
| 2004/0064531 A1 * | 4/2004 | Wisner .......................... | 709/221 |
| 2005/0039187 A1 * | 2/2005 | Avakian et al. ............... | 719/310 |
| 2005/0039190 A1 * | 2/2005 | Rees et al. ...................... | 719/316 |
| 2005/0060237 A1 * | 3/2005 | Barsness et al. ................ | 705/26 |
| 2005/0289231 A1 | 12/2005 | Harada et al. | |

(Continued)

FOREIGN PATENT DOCUMENTS

JP    11-212837 A    8/1999
JP    2000-267898 A    9/2000

(Continued)

OTHER PUBLICATIONS

Japanese Office Action mailed Aug. 5, 2014 for corresponding of Japanese Patent Application 2011-085669, with Partial English Translation, 4 pages.

*Primary Examiner* — Chat Do
*Assistant Examiner* — Jae Jeon
(74) *Attorney, Agent, or Firm* — Fujitsu Patent Center

(57) ABSTRACT

To which method on each method call order pattern included in a series of application codes executed in response to a request a method included in an application code executed in response to a request corresponds is detected; a code is generated based on identification information corresponding to the detected method on the call order pattern; and the generated code is inserted to the application code.

9 Claims, 35 Drawing Sheets

(56) References Cited

U.S. PATENT DOCUMENTS

| | | |
|---|---|---|
| 2006/0031823 A1* | 2/2006 | Vasilevskiy et al. .......... 717/144 |
| 2006/0085537 A1* | 4/2006 | Dickerson et al. ............ 709/224 |
| 2007/0027838 A1* | 2/2007 | Newport et al. .................. 707/2 |
| 2007/0260589 A1* | 11/2007 | Yugami ............................. 707/3 |
| 2009/0313600 A1* | 12/2009 | Ayers et al. ................... 717/106 |
| 2010/0057843 A1* | 3/2010 | Landsman et al. ............ 709/203 |
| 2011/0113224 A1 | 5/2011 | Isshiki et al. |
| 2011/0307507 A1* | 12/2011 | Zhou et al. .................... 707/769 |
| 2013/0036104 A1* | 2/2013 | Hsu ................................ 707/698 |

FOREIGN PATENT DOCUMENTS

| | | |
|---|---|---|
| JP | 2000-315198 A | 11/2000 |
| JP | 2001-256135 | 9/2001 |
| JP | 2002-333992 A | 11/2002 |
| JP | 2006-11683 A | 1/2006 |
| JP | 2006-155525 | 6/2006 |
| JP | 2010-204713 A | 9/2010 |
| JP | 2011-65304 A | 3/2011 |
| WO | 2010/001766 A1 | 1/2010 |

* cited by examiner

402(#1)

METHOD NAME    TIME UNTIL END
methodA        10 s
methodB         4 s
methodB         3 s
methodC         2 s
methodD         1 s

402(#2)

METHOD NAME    TIME UNTIL END
methodA         7 s
methodB         5 s
methodE         1 s

401 METHOD SEQUENCE TABLE

| METHOD SEQUENCE | NUMBER OF APPEARANCE | REMAINING TIME OF FIRST–FIFTH METHOD CALL | | | | |
|---|---|---|---|---|---|---|
| | | 1 | 2 | 3 | 4 | 5 |
| A-B-B-C-D | 1 | 10 | 4 | 3 | 2 | 1 |
| A-B-E | 1 | 7 | 5 | 1 | | |

F I G.  4

207 MODEL NUMBER TRANSITION TABLE

| METHOD | MODEL NUMBER TRANSITION |
|---|---|
| methodA | *->1 |
| methodB | 1->2, 2->3 |
| methodE | 2->4 |

F I G. 9

207 MODEL NUMBER TRANSITION TABLE

| METHOD | MODEL NUMBER TRANSITION |
|---|---|
| methodA | *->1 |
| methodB | 1->2, 2->3 |
| methodE | 2->4 |

```
methodB() {
  ......
}
```
1101 (PART OF 201)

```
methodB() {
  if (MODELID==1) MODELID=2;
  else if (MODELID==2) MODELID=3;
  else { /* Do nothing */ }
  ......
}
```
1102 (PART OF 209)

F I G.  1 1

```
1401
THREAD ID  START/END  METHOD NAME  TIME
1          START      methodA      16:10.10
1          START      methodB      16:10.16
1          END        methodB      16:10.17
1          START      methodB      16:10.17
1          END        methodB      16:10.18
1          START      methodC      16:10.18
1          END        methodC      16:10.19
1          START      methodD      16:10.19
1          END        methodD      16:10.20
1          END        methodA      16:10.20
```

```
1402
THREAD ID  START/END  METHOD NAME  TIME
2          START      methodA      16:20.00
2          START      methodB      16:20.02
2          END        methodB      16:20.03
2          START      methodE      16:20.05
2          END        methodE      16:20.06
2          END        methodA      16:20.07
```

```
METHOD NAME   TIME UNTIL END
methodA       10 s
methodB        4 s
methodB        3 s
methodC        2 s
methodD        1 s
```

1502

```
METHOD NAME   TIME UNTIL END
methodA       7 s
methodB       5 s
methodE       1 s
```

FIG. 15

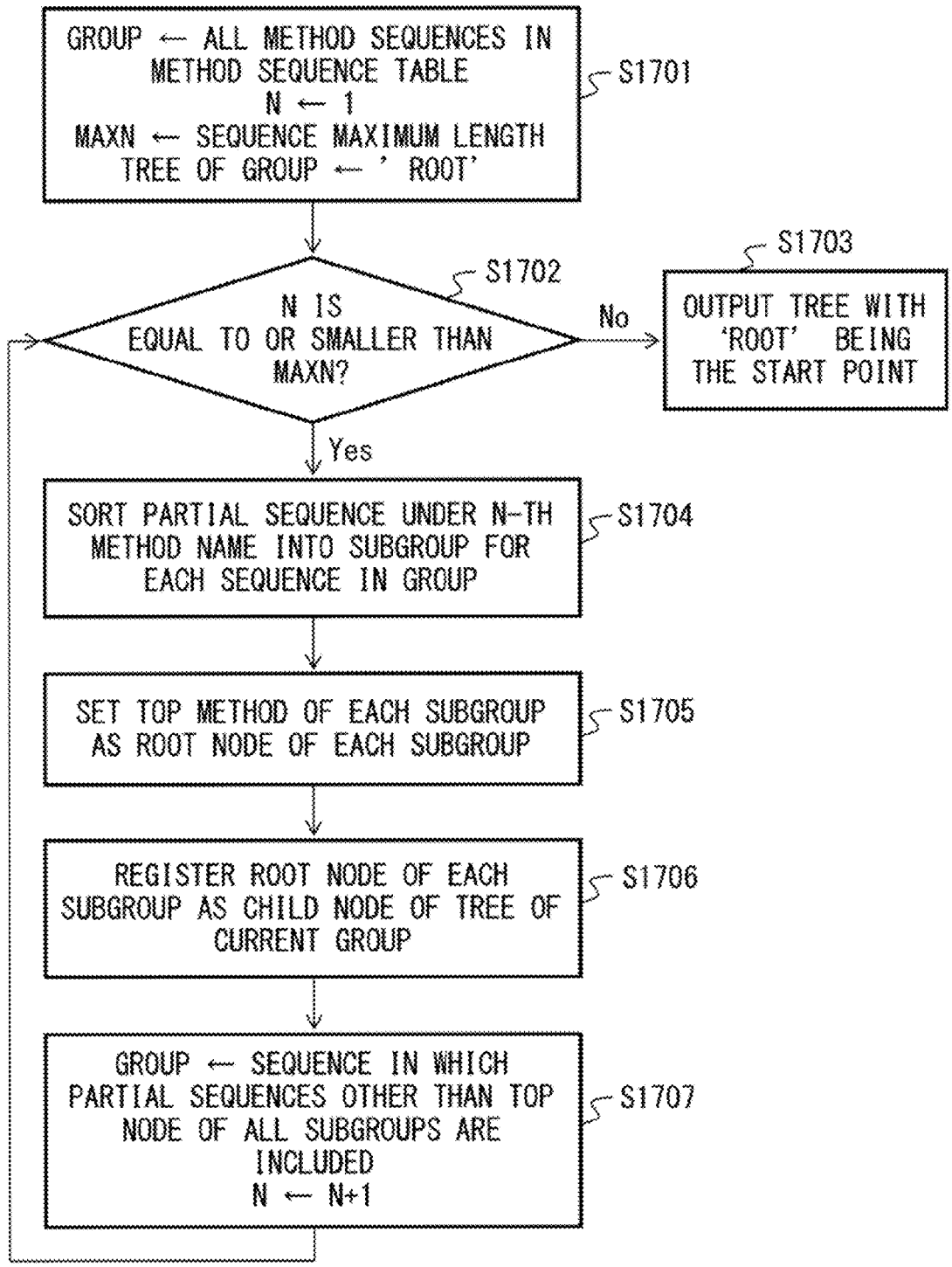
F I G. 1 7

1901 AVERAGE TIME CALCULATION TABLE (INITIAL STATE)

| MODEL NUMBER | FREQUENCY OF APPEARANCE | ACCUMULATED TIME OF TIME UNTIL METHOD COMPLETION | | | |
|---|---|---|---|---|---|
| | | 1 | 2 | 3 | 4 | 5 |
| 1 | 0 | 0 | 0 | 0 | 0 | 0 |
| 2 | 0 | 0 | 0 | 0 | 0 | 0 |
| 3 | 0 | 0 | 0 | 0 | 0 | 0 |
| 4 | 0 | 0 | 0 | 0 | 0 | 0 |

(a)

CORRESPONDING TO MODEL NUMBER IN MODEL TABLE

1901 AVERAGE TIME CALCULATION TABLE

| MODEL NUMBER | FREQUENCY OF APPEARANCE | ACCUMULATED TIME OF TIME UNTIL METHOD COMPLETION | | | |
|---|---|---|---|---|---|
| | | 1 | 2 | 3 | 4 | 5 |
| 1 | 10 | 85 | 45 | 20 | 10 | 5 |
| 2 | 10 | 85 | 45 | 20 | 10 | 5 |
| 3 | 5 | 50 | 20 | 15 | 10 | 5 |
| 4 | 5 | 35 | 25 | 5 | 0 | 0 |

501 PROCESS TYPE BRANCHING TREE

```
1   2   3   4
A - B - C - D
    |
    4
    E
```

1901 AVERAGE TIME CALCULATION TABLE

| MODEL NUMBER | FREQUENCY OF APPEARANCE | 1 | 2 | 3 | 4 | 5 |
|---|---|---|---|---|---|---|
| 1 | 1+1= 2 | 10+7= 17 | 4+5= 9 | 3+1= 4 | 2 | 1 |
| 2 | 1+1= 2 | 10+7= 17 | 4+5= 9 | 3+1= 4 | 2 | 1 |
| 3 | 1 | 10 | 4 | 3 | 2 | 1 |
| 4 | 1 | 7 | 5 | 1 | 0 | 0 |

401 METHOD SEQUENCE TABLE

| METHOD SEQUENCE | NUMBER OF APPEARANCE | 1 | 2 | 3 | 4 | 5 |
|---|---|---|---|---|---|---|
| A-B-C-D | 1 | 10 | 4 | 3 | 4 | 2 |
| A-B-E | 1 | 7 | 5 | 1 | 2 | 1 |

FIG. 22

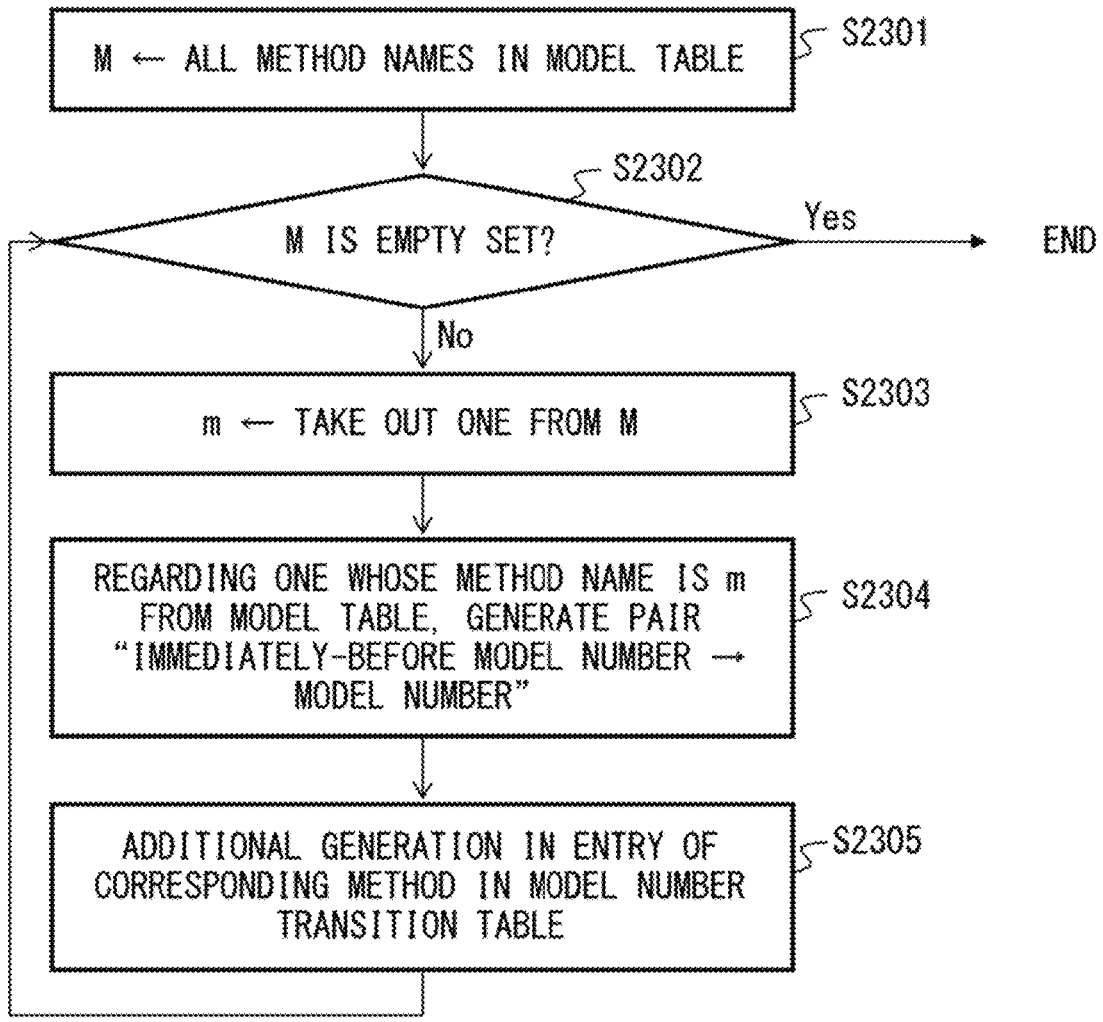
F I G. 2 3

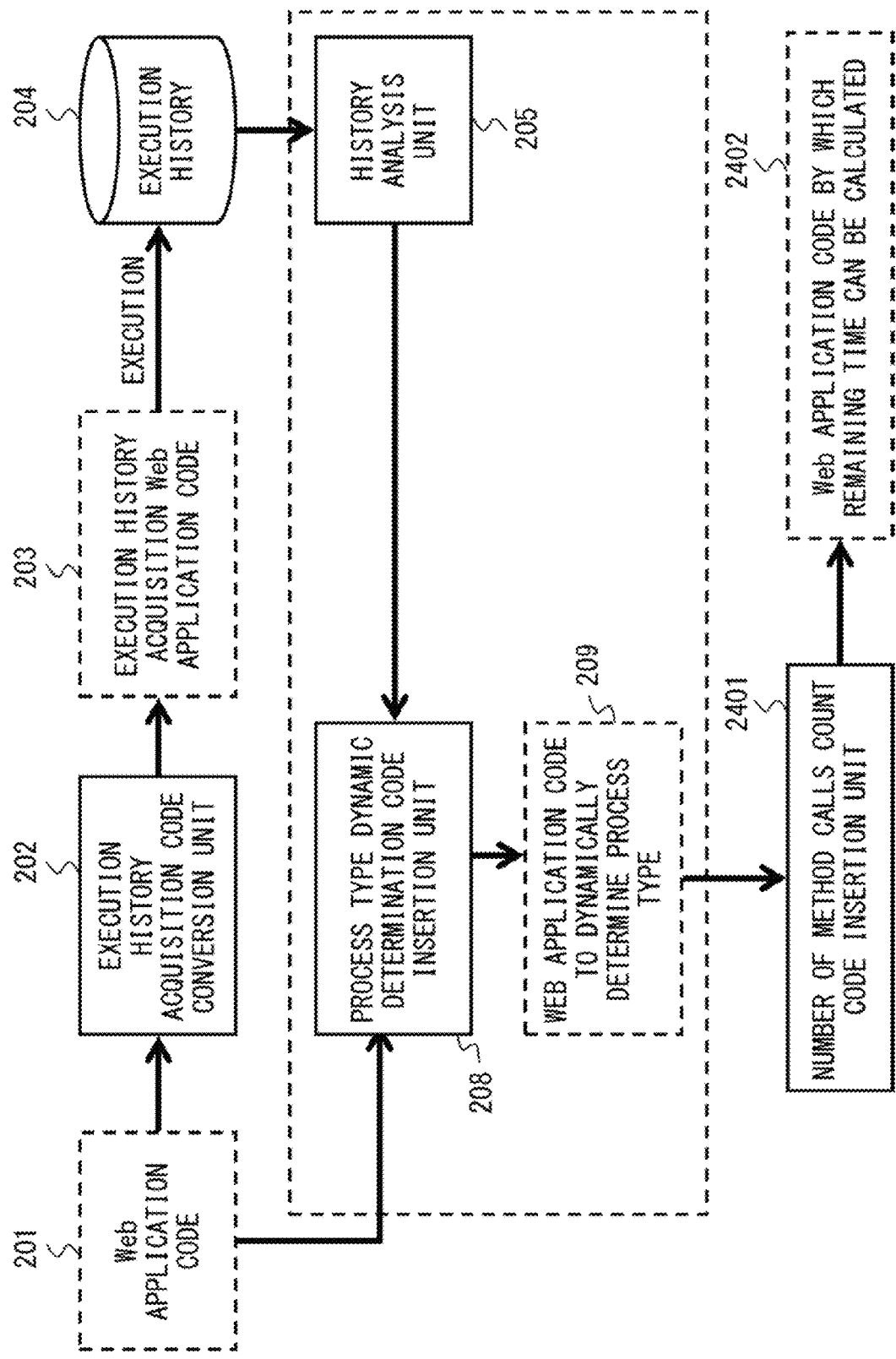
F I G. 24

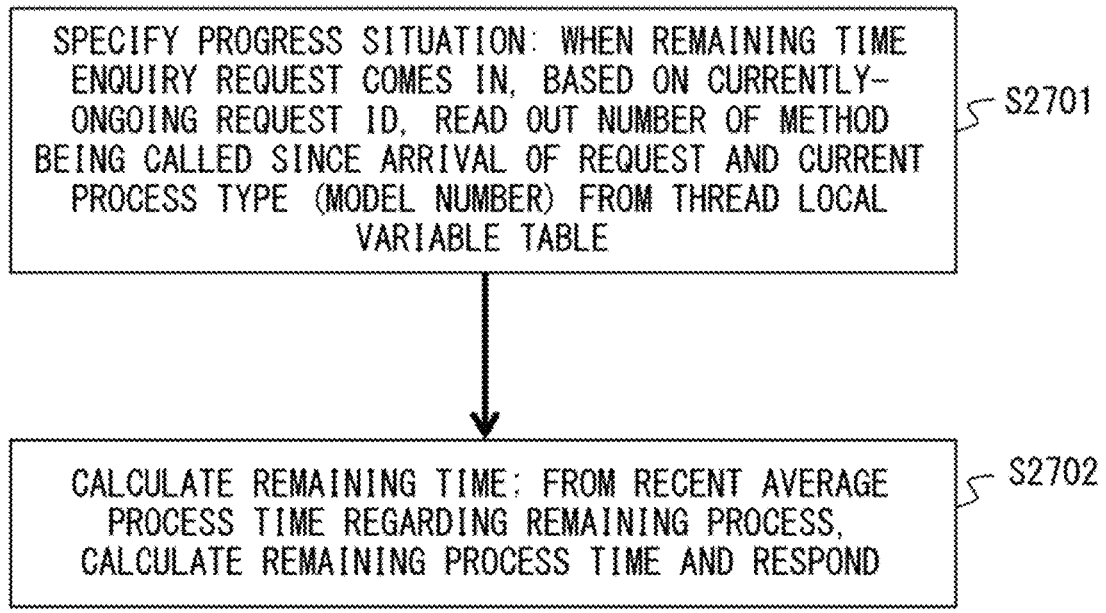
F I G. 27

CASE OF MODELID VALUE=4 NCALL VALUE=3

206 MODEL TABLE

| Model number | Method name | 1 | 2 | 3 | 4 | 5 | Immediately-before model number |
|---|---|---|---|---|---|---|---|
| 1 | A | 8.5 | 4.5 | 2 | 1 | 0.5 | — |
| 2 | B | 8.5 | 4.5 | 2 | 1 | 0.5 | 1 |
| 3 | B | 10 | 4 | 3 | 2 | 1 | 2 |
| 4 | E | 7 | 5 | 1 | 0 | 0 | 2 |

Remaining time being 1 second can be understood

FIG. 29

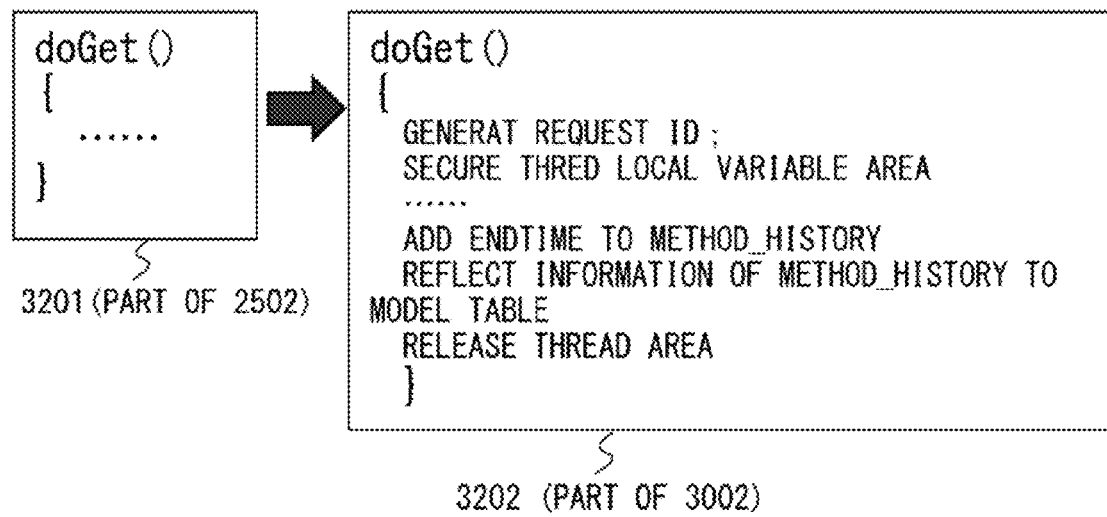
F I G. 3 2

206 Model table

| Model number | Method name | 1 | 2 | 3 | 4 | 5 | Immediately-before model number |
|---|---|---|---|---|---|---|---|
| 1 | A | 8.5 | 4.5 | 2 | 1 | 0.5 | - |
| 2 | B | 8.5 | 4.5 | 2 | 1 | 0.5 | 1 |
| 3 | B | 10 | 4 | 3 | 2 | 1 | 2 |
| 4 | E | 7 | 5 | 1 | 0 | 0 | 2 |

1901 Average time calculation table

| Model number | Frequency of appearance | 1 | 2 | 3 | 4 | 5 |
|---|---|---|---|---|---|---|
| 1 | 1 | 8.5 | 4.5 | 2 | 1 | 0.5 |
| 2 | 1 | 8.5 | 4.5 | 2 | 1 | 0.5 |
| 3 | 1 | 10 | 4 | 3 | 2 | 1 |
| 4 | 1 | 7 | 5 | 1 | 0 | 0 |

F I G. 3 3

MODEL ID:3    A-B-B-C-D

METHOD_HISTORY

TIME    10000    10008    10015    10023    10025    10030
         ↓        ↓        ↓        ↓        ↓
REMAINING  30      22       15       7        5 ┈┈┈┈┐
TIME
CALCULATION

| MODEL NUMBER | NUMBER OF APPEARANCE | 1 | 2 | 3 | 4 | 5 |
|---|---|---|---|---|---|---|
| 1 | 2 | 38.5 | 26.5 | 17 | 8 | 5.5 |
| 2 | 2 | 38.5 | 26.5 | 17 | 8 | 5.5 |
| 3 | 2 | 40 | 26 | 18 | 9 | 6 |
| 4 | 1 | 7 | 5 | 1 | 0 | 0 |

1901 AVERAGE TIME CALCULATION TABLE

F I G. 3 4

CODE CONVERSION METHOD, APPARATUS, STORAGE MEDIUM AND REQUEST REMAINING TIME RESPONSE METHOD

CROSS-REFERENCE TO RELATED APPLICATION

This application is based upon and claims the benefit of priority of the prior Japanese Patent Application No. 2011-085669, filed on Apr. 7, 2011, the entire contents of which are incorporated herein by reference.

FIELD

The embodiment described herein relates to a code conversion method, apparatus, program and a request remaining time response method.

BACKGROUND

In the system of the WWW (World Wide Web) service (hereinafter, referred to as the "Web service"), there is an issue that a significant delay of a request induces discontinuation of a user request, leading to loss of a business chance.

In order to handle this, a technique to restrain the user behavior to the current request by presenting the remaining processing time has been known.

When the process type that is being processed currently is recognized at a high speed and accurately, the remaining time for the ongoing process may be recognized accurately.

As a conventional technique to determine the request type that is being executed, a technique as described below has been known. A reception apparatus to receive a plurality of types of requests from a plurality of client apparatuses connected via the network; a status memory to sequentially store requests received at the reception apparatus; a statistics memory that stores a predicted processing time for each of combinations of the types of requests and the numbers of the requests; a processor to read out, when a request is received at the reception apparatus, the predicted processing time corresponding to the type of requests and the number of requests stored currently in the status memory from the statistics memory and to calculate the waiting time, and a transmission apparatus to transmit the waiting time calculated by the processor via the network to the client apparatus that transmitted the request are provided (Patent Document 1 for example).

In addition, a conventional technique as described below has also been known. It provides a control apparatus that controls the average response time from when an information processing apparatus receives a processing request until it responds to the processing request, having a target response time acquisition unit to obtain the target response time that is the target value of the average response time; a predicted response time calculation unit to calculate, regarding a case in which one of a plurality of operation modes with different processing performance from each other, the predicted response time that is the predicted value of the average response time at the point of time at which a predetermined reference period has passed since the operation mode is set in the information processing apparatus; and an operation mode setting unit to set, when the predicted response time calculated by the predicted response time calculation unit is less than the target response time, the operation mode in the information processing apparatus (Patent Document 2 for example).

PRIOR ART DOCUMENTS

Patent Documents

[Patent Document 1] Japanese Laid-open Patent Publication No. 2001-256135
[Patent Document 2] Japanese Laid-open Patent Publication No. 2006-155525

However, the conventional techniques described above have a problem that advance knowledge of the character sequence of the URL (uniform resource locator) corresponding to the request type and the call sequence and the like is required and it takes time to handle a new system.

Since the Web service in recent years has become complicated with more process types, it is becoming difficult to know the process type in advance.

SUMMARY

In an example of an aspect, to which method on each method call order pattern included in a series of application codes executed in response to a request a method included in an application code executed in response to a request corresponds is detected; a code is generated based on identification information corresponding to the detected method on the call order pattern; and the generated code is inserted to the application code.

In an aspect, it becomes possible to automatically judge the process type.

Meanwhile, in an aspect, it becomes possible to correctly recognize the remaining time of the process in progress, based on the automatic judgment of the process type The object and advantages of the invention will be realized and attained by means of the elements and combinations particularly pointed out in the claims.

It is to be understood that both the foregoing general description and the following detailed description are exemplary and explanatory and are not restrictive of the invention, as claimed

BRIEF DESCRIPTION OF THE DRAWINGS

FIG. 4 is an illustration diagram of a process of generating a method sequence table and a data configuration example in the first embodiment.

FIG. 9 is an illustration diagram of a generation process of a model number transition table and a data configuration diagram in the first embodiment.

FIG. 11 is an illustration diagram of an embedding process of a program code to update the model number in the first embodiment.

FIG. 14 is an illustration diagram of the process in step S2-1 in FIG. 12.

FIG. 15 is an illustration diagram of the process in step S2-2 in FIG. 12.

FIG. 17 is a flowchart illustrating the detail process in step S2-4 in FIG. 12.

FIG. 19 is a diagram illustrating a data configuration example of an average time calculation table used in the process in step S2-7 in FIG. 12.

FIG. 22 is an illustration diagram (part 2) of the process in step S2-7 in FIG. 12.

FIG. 23 is a flowchart illustrating the detail process in step S2-8 in FIG. 12.

FIG. 24 is a system configuration diagram of the second embodiment.

FIG. 27 is a flowchart of the process of a remaining time calculation thread in the third embodiment.

FIG. 29 is an illustration diagram of a calculation process of the remaining time in the third embodiment.

FIG. 32 is an illustration diagram of an injection process of a thread end time recording code for remaining time update in the fourth embodiment.

FIG. 33 is an illustration diagram (part 1) of a process to reflect information of METHOD_HISTORY in the model table in the fourth embodiment.

FIG. 34 is an illustration diagram (part 2) of a process to reflect information of METHOD_HISTORY in the model table in the fourth embodiment.

DESCRIPTION OF EMBODIMENTS

Hereinafter, embodiments for implementing the present invention are described in detail with reference to drawings.

Figure 1:
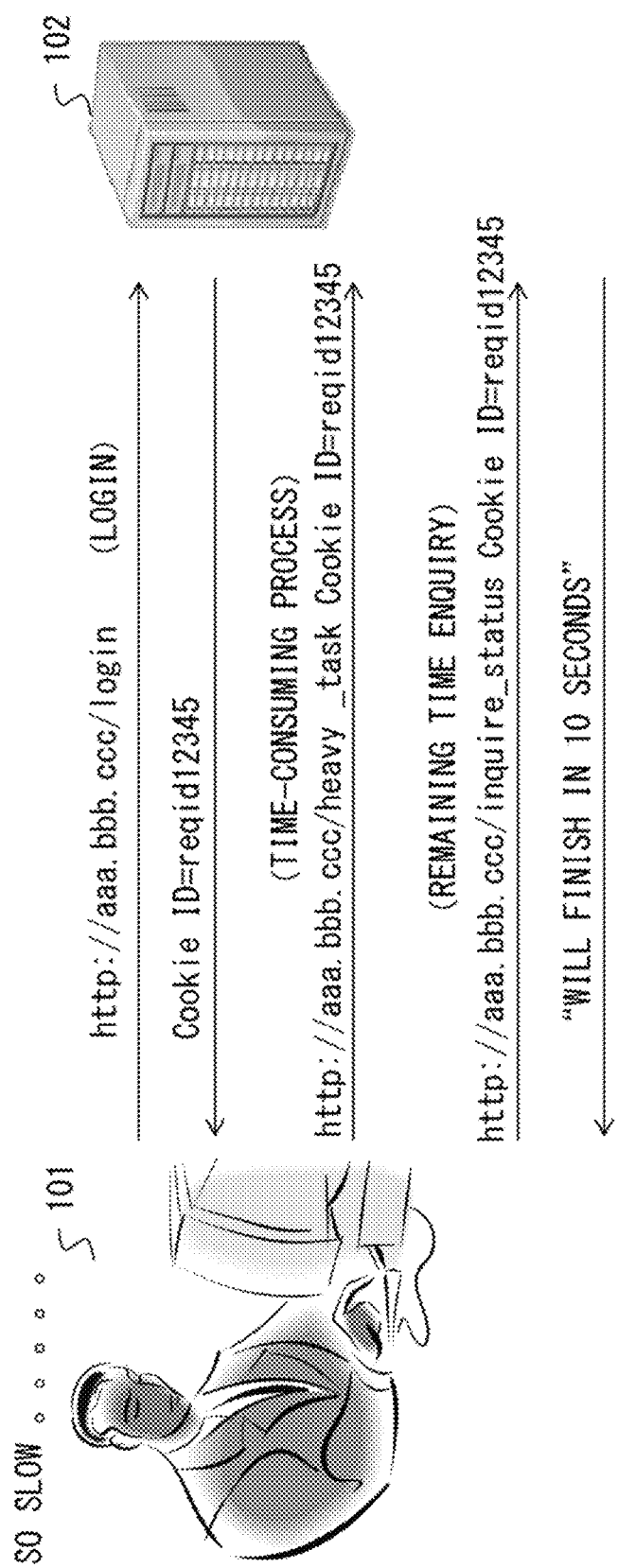
FIG. 1 is an illustration diagram of an example of a usage scene of a remaining time enquiry sequence.

FIG. 1 is an illustration diagram of an example of a usage scene of a remaining time enquiry sequence. For example, a client computer 101 that the user operates specifies URL "http://aaa.bbb.ccc/login" as the access address and logs in to the system. As a result, from a server computer 102 to the client computer 101, according to a parameter illustrated as "Cookie ID=reqid12345", a request ID "reqid12345" is returned. In the server computer 102, the system of the Web server is in operation. Then, upon receiving a request from the client computer 101, the Web server issues the received request to an application program operation on the same (may also be different) application server computer as the server computer 102. As a result, on the application sever computer, a thread is secured corresponding to the above request ID "reqid12345", and a series of method sequence of the application program is executed.

The application program accesses a database on the same or different data base server computer as the server computer 102 mentioned above and the application server computer for example. In such a process, there is a case in which a large amount of processing time is required in the operation for the database. A case in which, in FIG. 1, a process "http://aaa.bbb.ccc/heavy_task Cookie ID=reqid12345" that takes time is requested by the client computer 101 is considered for example. In this case, in the thread that executes the corresponding application program on the application server computer, a large amount of time is required for the process, and a response cannot readily be returned to the client computer 101.

Since no response is readily returned, there is a possibility that the user that operates the client computer 101 may think that the system froze up or give up halfway and discontinue the operation. Such a situation leads to degradation of the service performance. Then, it is assumed that a request "http://aaa.bbb.ccc/inquire_status Cookie ID=regid12345" to enquire the remaining time could be issued from the client computer 101. In response to this, the server computer 102 may calculate the remaining time of the process of the thread corresponding to the request ID "reqid 12345" and return a response such as "will be finished in 10 seconds" to the client computer 101. Accordingly, it becomes possible for the user operating the client computer 101 to understand the processing situation of the current request appropriately, making it possible to avoid a case such as to give up the operation, and the service performance improves.

Each embodiment described below is a system that is capable of providing a remaining time enquiry service as described above. In the description below, for the convenience of description, the description is made on an assumption that the system of the application server is operating on the server computer 102 in FIG. 1, while implementation may be done in the same way in the case in which it operates on another server computer, with the only difference being the execution location.

Figure 2:
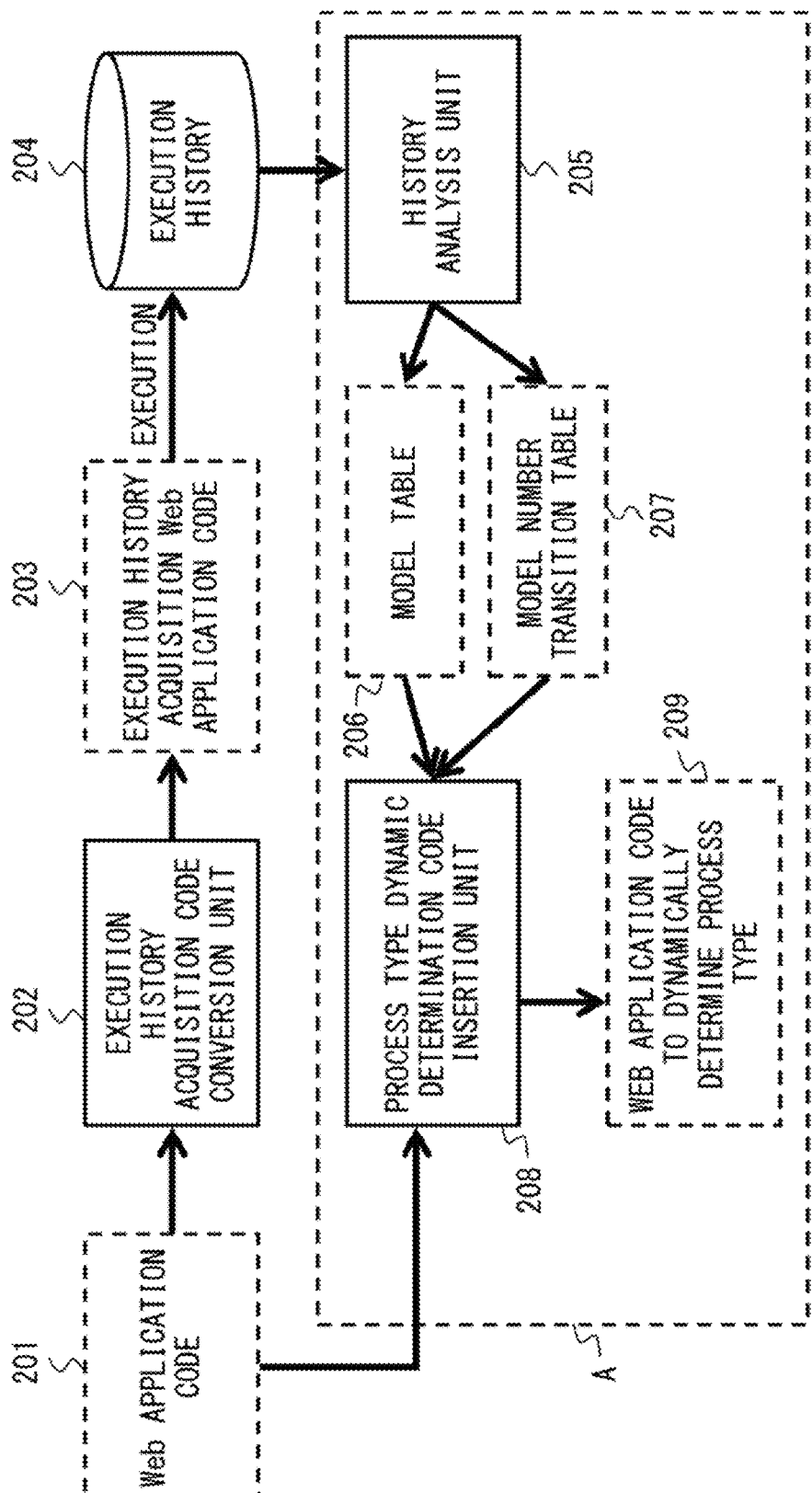
FIG. 2 is a system configuration diagram of the first embodiment.

FIG. 2 is a system configuration diagram of the first embodiment, which operates on the server computer 102 in FIG. 1. The system is a system of an application server that executes an application program based on a request that is received by a system of a Web server that is not particularly illustrated in the drawing from the client computer 101 in FIG. 1. As described above in "Background", in the conventional technique, the process type of the request needed to be known in advance. In this regard, the system of the first embodiment is a technique in which a program code to automatically determine the process type can be inserted into the application program by analyzing the execution history.

In FIG. 2, a Web application code 201 is an application program that provides the Web service based on a request from the client computer 101, and accesses a database system and the like that is not particularly illustrated in the drawing to execute the process. The Web application code 201 is an application program that is described by the Java programming language for example. Here, "Java" is the trademark in the United States and in other countries of Oracle Corporation and its subsidiaries and associates. The Web application code 201 is stored in an external storage apparatus such as a hard disc storage apparatus in the server computer 102 in FIG. 1. Then, upon execution, it is loaded from the external storage apparatus onto a memory (main storage apparatus) and executed. At this time, if the request is accepted, by the CPU, a memory area to be used by a thread corresponding to its request ID is secured on the memory.

An execution history acquisition code conversion unit 202 embeds, when the Web application code 201 is executed, a program code for enabling recording of the execution start time and the execution end time of each method included in the code into the Web application code 201. As a result, the Web application code 201 is converted into an execution history acquisition Web application code 203. Then, every time when the execution history acquisition Web application code 203 is executed instead of the Web application code 201, an execution history is recorded. The process by the execution history acquisition code conversion unit 202 is a process in which the CPU in the server computer 102 (FIG. 1) executes a control program loaded onto the memory from the external storage apparatus.

The function to record the execution history 204 described above is a process that is normally implemented for the Web-based application.

A history analysis unit 205 judges, according to the execution history 204 of the call for the method for each request, the process type in which the method is included, and estimates the relationship between the number of calls of the method included in the process type (hereinafter, the number of calls is referred to as the "the number of method calls" and the remaining time for the process.

That is, the history analysis unit 205 obtains method call sequences that sort out sequences including a series of call order patterns of the call for the method for each request from the execution history 204. Then, the history analysis unit 205 calculates the average value of the time from the call for each method executed on the method call sequences until the completion of the method call sequences, and writes in the result into a method sequence table described later. Meanwhile, when the number of method sequence is one, the time from the call for each method until the sequence completion, is written into the method sequence table. The data structure of the method sequence table is stored on a memory in the server computer 102 (FIG. 1) that is not particularly illustrated in the drawing.

Next, the history analysis unit 205 generates a branching tree from the program. Each method of the program is associated with a node (nodal point), and the graph (tree) made by associating the transition from each method to a method with a branch is the branching tree. One path from the starting point to the ending point on the branching tree corresponds to a method sequence of the program. The history analysis unit 205 compares the method call for every number of calls among each method call sequence, and sequentially from the call for the top method in each method call sequence, calls for the common method are put together as a node. After that, the history analysis unit 205 also puts together calls for a method that is not common as a node, to generate a process type branching tree that is tree-structure data. The data structure of the process type branching tree is stored on the memory in the server computer 102 that is not particularly illustrated in the drawing.

Next, the history analysis unit 205 marks a branched node in the respective nodes that constitute the process type branching tree as an important call to decide the process type. After that, the history analysis unit 205 traverses each node from each of the market important nodes along the process type branching tree towards the starting node direction. Then, it further marks the call for the same method as in the important call and the call for the method of the starting node as the important call.

Next, the history analysis unit 205 defines a model number that is unique (individually separate) and different from the method name as a piece of identification information for the method in all the important calls, and associates it with the process type. Further, the history analysis unit 205 calculates the relationship between the number of method calls and the remaining time for each model number. Accordingly, the relationship between the number of method calls for the method included in the process type and the process remaining time is estimated. The result of the estimation is written into a model table 206 in which each of the model numbers is arranged in each column and each number of method calls is arranged in each column. The data structure of the model table 206 is written into a memory in the server computer 102 (FIG. 1) that is not particularly illustrated in the drawing.

Meanwhile, the history analysis unit 205 obtains the transition relationships between the model numbers, and writes the transition relationship into a model number transition table 207. The data structure of the model number transition table 207 is stored on a memory in the server computer 102 (FIG. 1) that is not particularly illustrated in the drawing.

As described above, by the history analysis unit 205, the process type in which a method is included may be judged from the execution history 204 of the method call for each request, and the transition relationship of the method execution stage and the process type. Specifically, a process type branching tree is generated by comparison among method call sequence obtained from the execution history 204, the model number is defined as the important call defined there, and the transition relationship between the model numbers may be obtained as the transition relationship between the method execution stage and the process type. In the first embodiment, as described above, since the transition relationship between the method execution stage and the process type, specifically, the transition relationship between the model numbers can be obtained, as long as the method execution stage can be judged, it becomes possible to automatically judge the process type.

Furthermore, in the first embodiment, by the history analysis unit 205, for each process type, specifically for each model number, the relationship between the number of method calls for each method included in the process type corresponding to the model number and the process remaining time may be estimated. Accordingly, from the result of automatic judgment of the process type, by further obtaining the number of method calls, it becomes possible to obtain the remaining time for the current process.

The process in the history analysis 205 described above is a process in which a CPU in the server computer 102 (FIG. 1) executes a control program loaded onto a memory from an external storage apparatus.

A process type dynamic determination code insertion unit 208 automatically generates a thread local variable area that is a variable area to record information including the current model number with respect to the thread that is to be executed based on a request. In addition, the process type dynamic determination code insertion unit 208 automatically generates a program code to judge the current process type in the thread being executed while referring to and updating the recorded contents in the thread local variable area. Then, the process type dynamic determination code insertion unit 208 inserts these generated program codes into the Web application code being the application program.

More specifically, the process type dynamic determination code insertion unit 208 automatically generates the following program code and embeds it into the program code of a method executed first at the time of a request in the Web application code 201. The program code secures a thread local variable area to record information including the current MODELID and the current number of method calls.

In addition, the process type dynamic determination code insertion unit 208 automatically generates the following program code and embeds it into the program code of each method corresponding to each model number in the Web application code 201. The program code decides the model number to which transition is performed with respect to the current model number stored in the thread local variable area as the current process type, based on the transition relationship between the model numbers registered in the model number transition table 207. Then, the program code updates the model number corresponding to the variable value of MODELID in the thread local variable area to the decided model number.

As described above, by the process type dynamic determination code insertion unit 208, the automatically generated program code is embedded into the Web application code 201, and the result is output as a Web application 209 to dynamically determine the process type.

As described above, with the Web application code 209 to dynamically determine the process type being executed by the process type dynamic determination code insertion unit 208, the following process is realized. First, by a thread local variable area being secured for each thread to be executed, it becomes possible to keep the current model number according to the execution status of the thread. Furthermore, it becomes possible, during the execution of the method on the thread, to judge the transition of the model number corresponding to the execution stage of the current method, from the transition relationship of the model number in the thread local variable area, the execution stage of the method obtained by the history analysis unit 205 and the model number. Then, the model number in the thread local variable are can be updated with the newly judged model number. As described above, in the first embodiment, it becomes possible, during the execution of the method on a thread, to dynamically determine the process type according to the execution stage.

The function of the process type dynamic determination code insertion unit 208 described above is a process in which the CPU in the server computer 102 (FIG. 1) executes a control program loaded onto the memory from the external storage apparatus.

Hereinafter, the operation of the first embodiment having the configuration described above is described more specifically.

Figure 3:
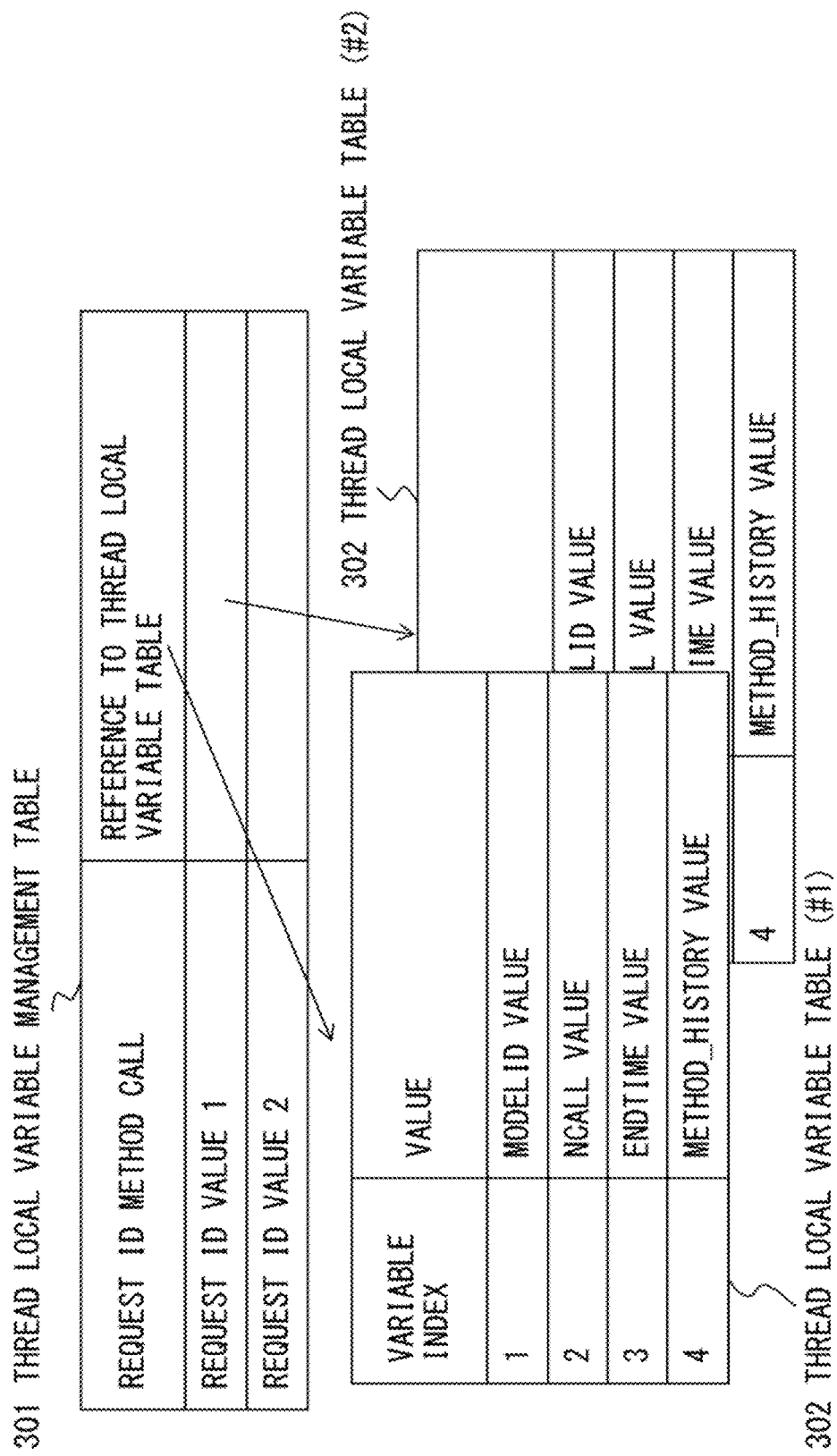
FIG. 3 is an illustration diagram of a data configuration example of a thread local variable area in the first embodiment.

FIG. 3 is a diagram illustrating a data configuration example of a thread local variable area secured on a memory for each tread by the process type dynamic determination code insertion unit 208. The thread local variable area has, for example, a thread local variable management table 301 and a thread local variable table 302.

In the thread local variable management table 301, which is a table existing on the system, a data set of the request ID and a reference pointer (reference address value) to the thread local variable table 302 is stored corresponding to each thread. In the example in FIG. 3, it is indicated that a request ID value 1 and a request ID value 2 are registered in the "request ID method call" item. The reference pointer is registered in the "reference to thread local variable table" item. As described above, the thread local variable area is secured for each thread. Then, each thread is corresponding one-to-one to each request ID. Therefore, when a certain request ID is received, by referring to the thread local variable management table 301 according to the request ID value, the storage address of the thread local variable table 302 being the thread local variable area of the thread corresponding to the request ID may be known. The thread local variable table is secured on a memory by the process type dynamic determination code insertion unit 208 when starting the thread corresponding to each request ID.

In the thread local variable table 302, a thread local variable group required for calculating the remaining time in a thread is stored. As the thread local variable group, four variables MODELID, NCALL, ENDTIME, METHOD_HISYORY are stored for example. Each thread local variable is referred to according to a variable index. When referring to the MODELID value, the variable index value 1, when referring to the NCALL value, the variable index value 2, when referring to the ENDTIME value, the variable index value 3, when referring to the METHOD_HISTORY array value, the variable index value 4 is specified respectively. Meanwhile, as long as the process of calculating the remaining time is realized, the thread local variable group is not limited to the group of these variables.

In the thread local variable table 302, the variable MODELID keeps the current model number of the thread. Meanwhile, the variable NCALL keeps the number of method calls in the thread up to the present time. The ENDTIME value and the METHOD_HISTORY sequence value are described later in the description of the fourth embodiment. It is found that, as described below, when the model number and the current number of method calls are known, the remaining time of the process until the completion of the thread can be estimated as the average value.

First, the Web application code 201 illustrated in FIG. 2 is called in units of the program code called a method. Now, on a thread secured for a certain request ID, when a series of a plurality of methods are called and executed, the series of method group is called a method call sequence. The type of the method call sequence may be extracted and sorted by judging the sequence of the method group executed for each request ID, from the execution history 204 in FIG. 2. On the execution history 204, there is a possibility that a plurality of sets of the call history of a method having a certain type of method call sequence. Here, the number of nodes included in the method call sequence is assumed as N. In this case, the time from the start of execution and the completion of the sequence (this is defined as the "remaining time" regarding the n-th method) for a method called n-th ($1 \leq n \leq N$) in the method call sequence can be calculated as follows. From the execution history 204, for the plurality of sets of histories for the certain type of method call sequence, the remaining time from the execution of the n-th method until the completion of the sequence in the history is calculated, and the average value of the remaining time for the plurality of sets of histories is calculated. This calculation is executed for all the nodes from the first to N-th. As a result, for each node called first to N-th in the certain method call sequence, the average value of the remaining time can be estimated. Furthermore, for each type of the method call sequence that can be sorted based on the execution history 204, for each node called sequentially in each sequence, the average value of the remaining time can be estimated. The history analysis unit 205 in FIG. 2 executes the calculation of the average value of the remaining time for each method call sequence and each number of method calls, and writes the calculation result into a method sequence table 401 whose storage area is secured on a memory of the server computer 102 (FIG. 1).

FIG. 4 is a diagram illustrating a generation process of the method sequence table 401 generated by the history analysis unit 205 and a data configuration example in the first embodiment. It is assumed that from the analysis result of the execution history 204, the history of the method call sequence executed in order of method (illustrated as "method" in the drawing) A-B-B-C-D, and the remaining time corresponding to each method in the sequence as 402 (#1) were obtained. In the same manner, it is assumed that the history of the method call sequence executed in order of method A-B-E, and the remaining time corresponding to each method in the sequence as 402 (#2) were obtained. According to these data, in the first line of the method sequence table 401, the method sequence "A-B-B-C-D" and the number of appearance=1 is registered. In addition, as the remaining time of the first method call, the remaining time=10 seconds of the "methodA" in the analysis result 402 (#1) are registered. As each remaining time for the second round, the remaining time=4 seconds of the "methodB" in the 402 (#1) is registered. As each remaining time for the third round, the remaining time=3 seconds of the "methodB" in the 402 (#1) is registered. As each remaining time for the fourth round, the remaining time=2 seconds of the "methodC" in the 402 (#1) is registered. As each remaining time for the fifth round, the remaining time=1 seconds of the "methodD" in the 402(#1) is registered. Next, in the second line of the method sequence table 401, the method sequence "A-B-E" and the number of appearance=1 is registered. In addition, as the remaining time of the first method call, the remaining time=7 seconds of the "methodA" in 402 (#2) are registered. As each remaining time for the second round, the remaining time=5 seconds of the "methodE" in the 402 (#2) is registered. As each remaining time for the third round, the remaining time=1 seconds of the "methodE" in the 402 (#2) is registered. Each remaining time for the fourth round and the fifth round do not exist and are not registered. Here, if a plurality of sets of method call sequences for the same method are analyzed from the execution history 204, the number of analysis is registered in the item of the number of appearance in the corresponding line in the method sequence table 401. Then, in the item of the remaining time of the method call for each round, the average value of each remaining time for the plurality of sets is calculated and registered.

As described above, ideally, once the method call sequence in the thread currently being executed and the number of current method calls, from the method sequence table 401, the remaining time regarding the current method can be calculated. However, each method can be called and executed independently. For this reason, at the point of time when a method is executed according to a certain request ID, which type of method call sequence is to be executed eventually as the whole thread according to the request ID cannot be confirmed, and the sequence may branch.

However, if how many threads have been called since the start of the thread before a certain method can be found out, the number of patterns of the method call sequences to be executed after the execution of the method can be analyzed by the sorting result of the method call sequence described above. Then, it becomes possible to calculate the remaining time corresponding to the current number of method calls as the average value of the remaining time for each number of method calls for the plurality of sets of method call sequences.

Specifically, among method call sequences sorted into a plurality of sorts in the method sequence table 401 in FIG. 4, method calls for each number of calls are compared. Then, calls for the common method are put together as a node, and after that, call for a method that is not common are also put together as a node, and data in a tree structure is generated in a storage area on a memory of the server computer 102 (FIG. 1).

Figure 5:
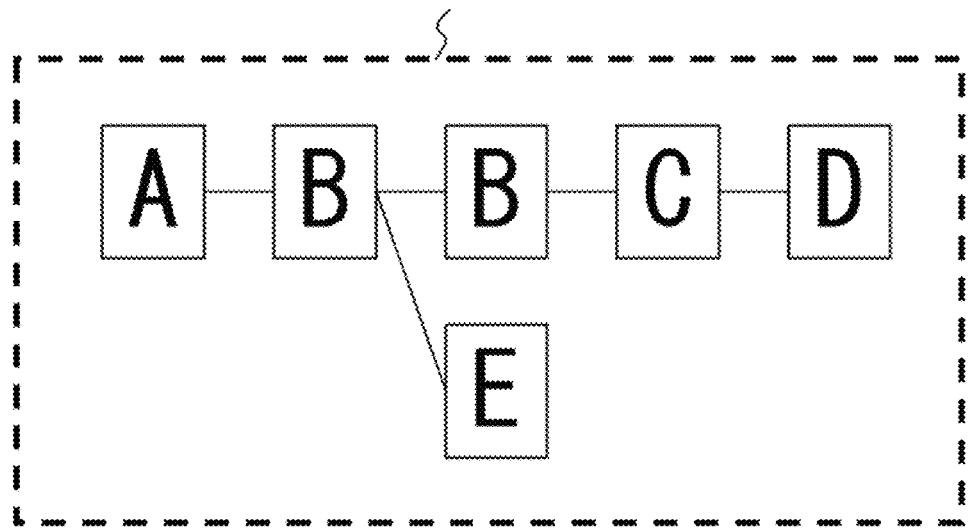
FIG. 5 is an illustration diagram of a generation process of a process type branching tree and a data configuration example in the first embodiment.

FIG. 5 is an illustration diagram of the generation process and a data configuration example of the process type branching tree 501 in the tree structure described above in the first embodiment. In the process type branching tree 501, to the node in the first layer, the method called first is associated. In the example in FIG. 5, this is the leftmost method A. The method A that is called first is connected to all the nodes in and under the second layer. For this reason, after the execution of the method A that is called first, the method call sequences of all the types (two types in FIG. 4) obtained on the method sequence table 401 in FIG. 4 are executed. Generally, to a node (but not necessarily one node) in the n-th layer (n≥1), the method called n-th is associated. Then, assuming that the part in the n+1-th layer and above connected beyond the node is branched into two patterns of paths for example, it follows that after the execution of the method called n-th, two patterns of method call sequences are to be performed. In the example in FIG. 5, to the node in the second later (second from the left), the method B called second is associated. Then, since the part in the third layer (third from the left) and above connected beyond the node is branched into two patterns of paths, it follows that two patterns of method call sequences are to be executed after the execution of the method called second. In the example in FIG. 5, these are the part "B-C-D" in the method call sequence "A-B-B-C-D" and the part "E" in the method call sequence "A-B-E". In addition, in the example in FIG. 5, to the node in the third layer (third from the left), the method B or E called third is associated. Then, the part in the fourth layer (fourth from the left) connected beyond the node on the method B side is only the one pattern of "C-D". For this reason, only the part "C-D" in the one pattern of method call sequence "A-B-B-C-D" is executed. Since no node is connected beyond the node on the method E side, the one type of the method call sequence "A-B-E" is confirmed for this path.

A case is considered in which, by using the process type branching tree 501 above, for example, that the current number of method calls is the first and the node A is being performed is found out. In this case, it can be understood that there is a possibility that, after that, the two types of method call sequences "A-B-B-C-D" and "A-B-E" registered in the method sequence table 401 in FIG. 4 may be executed the same number of times (in the example in FIG. 4, once respectively). For this reason, the remaining time can be estimated as the weighted average value 8.5 seconds (=(10 seconds×1 time+7 seconds×1 time)/(2 times)) obtained by adding weighting according to the appearance frequency of the remaining time "10 seconds" and "7 seconds" corresponding to the number of method calls for the first round of each of these two the method call sequences in the method sequence table 401 in FIG. 4. Next, a case is considered in which that the current number of method calls is the second and the node B is being performed is found out. In this case also, it can be understood that there is a possibility that, after that, two types, that is, the part "B-C-D" in the method call sequence registered in the method sequence table 4 in FIG. 4 and the part "E" in "A-B-E" may be executed. For this reason, the remaining time can be estimated as the weighted average value 4.5 seconds obtained by adding weighting according to the appearance frequency of the remaining time "4 seconds" and "5 seconds" corresponding to the number of method calls for the second round of each of these two the method call sequences in the method sequence table 401 in FIG. 4. Further, a case is considered in which that the current number of method calls is the third and the node B is being performed is found out. In this case also, it can be understood that there is a possibility that, after that, one type, that is, the part "C-D" in the method call sequence "A-B-B-C-D" registered in the method sequence table 401 in FIG. 4 may be performed. For this reason, the remaining time can be estimated as "3 seconds" corresponding to the number of method calls for the third round in the method call sequence "A-B-B-C-D" in the method sequence table 401 in FIG. 4. Meanwhile, a case is considered in which that the current number of method calls is the third and the node E is being performed is found out. In this case, it follows that the last node "E" in the method call sequence "A-B-E" registered in the method sequence table 401 is executed. For this reason, the remaining time may be estimated as the remaining time "1 second" corresponding to the number of method calls for the third round in the method call sequence "A-B-E" in the method sequence number in FIG. 4.

As described above, when the current number of method calls and the method name become apparent, it becomes possible to judge how many patterns of method call sequences are to be performed after the execution of the method, according to the process type branching tree 501. Accordingly, it becomes possible to calculate the current remaining time as the average value of the remaining time of the number corresponding to the current number of method calls regarding the method call sequences of the judged number of sets. However, the response performance is bad if the above calculation is to be performed every time when the enquiry request for the remaining time is issued. For this reason, regarding all the nodes that can be extracted from the process type branching tree 501, how many patterns of method call sequences are to be performed after the execution of the method corresponding to the node is judged and the average value of the remaining time is calculated and is registered in the table. Then, it becomes possible, when an enquiry request for the remaining time is issued, to estimate the remaining time at a high speed by referring to the table according to the current number of method call and the method name.

However, in practice, the process type branching tree 501 analyzed on the server computer 102 in FIG. 1 is expected to be in a highly complicated structure. Therefore, it is not efficient in a large-scale application server system to calculate the remaining time for all the nodes in all its layers.

Therefore, in this embodiment, the history analysis unit 205 marks only the node that determines the path of the process type branching tree 501, that is, the method that decides the process type, as the "important call". Then, the remaining time is calculated only for the method corresponding to the "important call" and the method of the start node.

Figure 6:
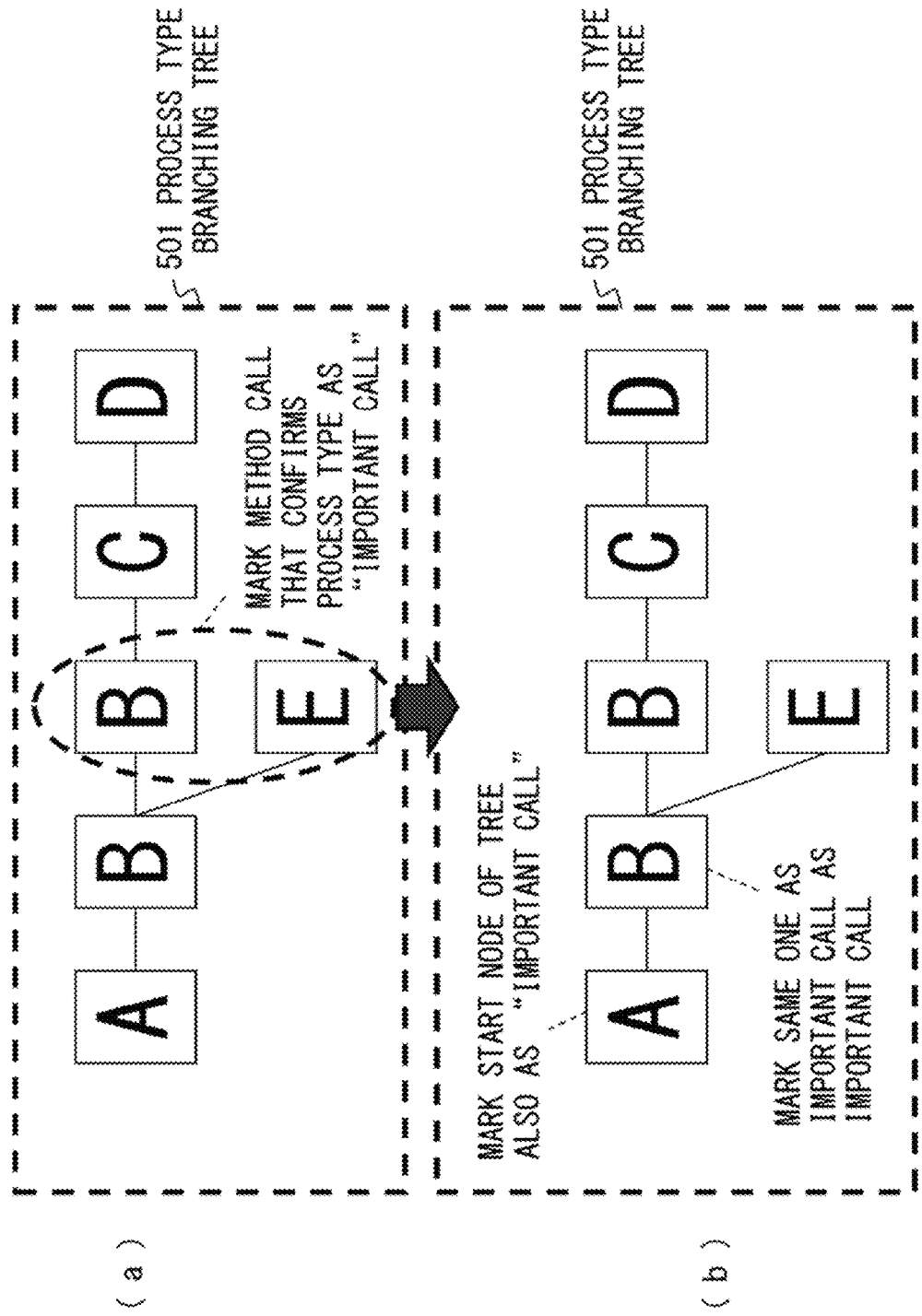
FIG. 6 is an illustration diagram of an extraction process of an important call in the first embodiment.

FIG. 6 is an illustration diagram of the extraction process of the important call in the first embodiment. The history analysis unit 205 in FIG. 2 marks, among the respective nodes that constitute the process type branching tree 501, the branched node as the important call that decides the process type. For example, in the process type branching tree 501 illustrated in FIG. 6(a) for example, the two branched dark-colored nodes (respective nodes corresponding to the methods B and E) in the third later enclosed by a broken-line ellipse are marked as the important call. After that, the history analysis unit 205 traverses each node along the process type branching tree 501 from each marked important call in the start node direction (leftward direction in the drawing). Then, the node of the same method as the important call and the start node are further marked as the important call. For example, in the process type branching tree 501 illustrated in FIG. 6(b), since the node of the method B is marked as the important call in the third layer, the node of the method B in the second layer in the dark color is also marked as the important call. Furthermore, the start node of the method A in the first layer in the dark color is also marked as the important call.

Next, the history analysis unit 205 in FIG. 2 defines a unique (individually separate) model number for all the important calls marked on the process type branching tree 501.

Figure 7:
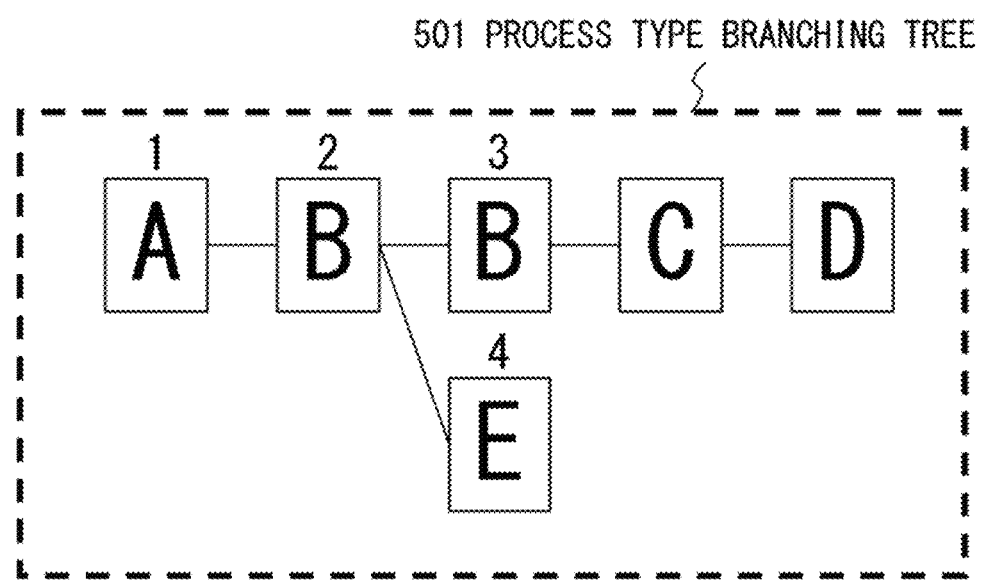
FIG. 7 is an illustration diagram of an assignment process of the model number in the first embodiment.

FIG. 7 is an illustration diagram of the assignment process of the model number in the first embodiment. In the example in FIG. 7, the model numbers 1, 2, 3, 4 are assigned respectively each of the nodes of the important calls marked as in FIG. 6(b). In this embodiment, the model number assigned to the important call is defined as described above. As described above, although it is ideal to directly judge the individual method call sequence, in consideration of the calculation efficiency, it is preferable to indirectly judge the process type through the model number determined representatively as described above.

Next, the history analysis unit 205 in FIG. 2 calculates the relationship between the number of method calls and the remaining time of the process for each model number described above, and stores it in a model table 206.

Figure 8:
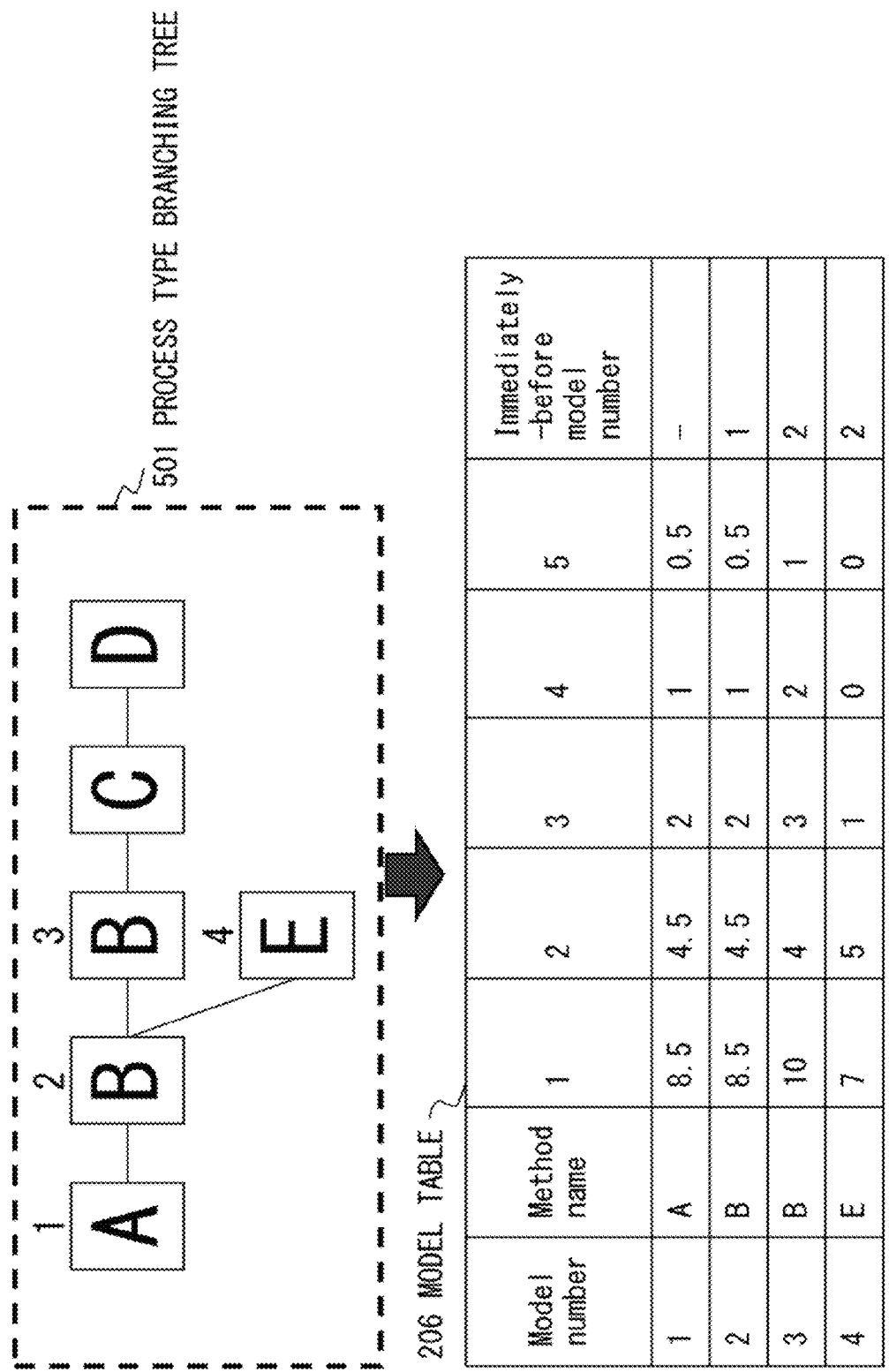
FIG. 8 is an illustration diagram of a generation process of a model table and a data configuration example in the first embodiment.

FIG. 8 is an illustration diagram of the generation process and a data configuration example of the model table 206 in the first embodiment. First, the history analysis unit 205 secures the storage area of the model table 206 on the memory of the server computer 102 (FIG. 1). Next, the history analysis unit 205 generates an entry (line data of the table) in the model table 206 for each model number assigned on the process type branching tree 501, and registers each model number in the "Model number" item. In addition, the method name corresponding to each model number is registered in the "Method name" item in the model table 206. In the example in FIG. 8, each entry corresponding to the model number 1, 2, 3, 4 is generated, and A, B, B, E are registered as the method name. Next, the history analysis unit 205 judges how many patterns of method call sequences are to be performed, corresponding to the entry of each model number in the model table 206, according to the process type branching tree 501 illustrated in FIG. 5. Next, the average value of each remaining time corresponding to each number of method calls regarding the judged number of the method call sequences is calculated. Then, the calculated average value of each remaining time is registered in the item corresponding to each number of method calls in the entry of each model number in the model table 206.

In the example in FIG. 8, for example, regarding the model number 1, according to the process type branching tree 501 illustrated in FIG. 8, it is understood that there is a possibility that two types of method call sequences "A-B-B-C-D" and "A-B-E" are executed. Accordingly, the remaining time for the method call for the first round many be calculated as the weighted average value 8.5 seconds (=(10 seconds×1 time+7 seconds×1 time)/(2 times)) obtained by adding weighting according to the appearance frequency of the remaining time "10 seconds" and "7 seconds" corresponding the number of method calls for the first round of each of the two the method call sequences in the method sequence table 401 in FIG. 4. In addition, the remaining time for the method call for the second round may be calculated as the weighted average value 4.5 seconds obtained by adding weighting according to the appearance frequency of the remaining time "4 seconds" and "5 seconds" corresponding to the number of method calls for the second round of each of the two the method call sequences in the method sequence table 401 in FIG. 4. In addition, the remaining time for the method call for the third round may be calculated as the weighted average value 2 seconds obtained by adding weighting according to the appearance frequency of the remaining time "3 seconds" and "1 second" corresponding to the number of method calls for the third round of each of these two the method call sequences in the method sequence table 401 in FIG. 4. Further, the remaining time for the method call for the fourth round may be calculated as the average value 1 second of "2 seconds" and "0 second" (no registration) corresponding to the number of method calls for each fourth round of the two of the method call sequences in the method sequence table 401 in FIG. 4. Then, the remaining time for the method call for the fifth round may be calculated as the average value 0.5 of a second of "1 second" and "0 second" (no registration) corresponding to the number of method calls for each fifth round of the two of the method call sequences in the method sequence table 401 in FIG. 4.

In FIG. 8, regarding the model number 2, according to the process type branching tree 501 illustrated in FIG. 8, in the same manner as for the model number 1, it is understood that there is a possibility that two types of method call sequences "A-B-B-C-D" and "A-B-E" are executed. Accordingly, each remaining time corresponding to each number of method calls corresponding to the model number 2 becomes the same as in the case of the model number 1.

In FIG. 8, regarding the model number 3, according to the process type branching tree 501 illustrated in FIG. 8, it is understood that only one type of the method call sequence "A-B-B-C-D" is executed. Accordingly, each remaining time registered corresponding to each number of method calls in the method call sequence in the method sequence table 401 in FIG. 4 is registered as it is as each remaining time corresponding to each number of method calls corresponding to the model number 3. That is, as each remaining time corresponding to each number of method calls for the first round, the second round, the third round, the fourth round and the fifth round, 10 seconds, 4 seconds, 3 seconds, 2 seconds, 1 seconds is registered.

In FIG. 8, regarding the model number 4, according to the process type branching tree 501 illustrated in FIG. 8, it is understood that only one type of the method call sequence "A-B-E" is executed. Accordingly, each remaining time registered corresponding to each number of method calls in the method call sequence in the method sequence table 401 in FIG. 4 is registered as it is as each remaining time corresponding to each number of method calls corresponding to the model number 4. That is, as each remaining time corresponding to each number of method calls for the first round, the second round, the third round, the fourth round and the fifth round, 7 seconds, 5 seconds, 1 seconds, 0 seconds, 0 seconds is registered. Meanwhile, regarding the method call sequence "A-B-E", no number of method calls exists for the fourth round and the fifth round, and 0 second is registered for the sake of convenience.

By using the model table 206 generated as described above, upon the enquiry request of the remaining time, the method corresponding to which model number is executed on the target thread can be judged, and when the number of method calls can also be judged, the remaining time can be obtained. For example, in FIG. 8, upon the enquiry request of the remaining time, when the model number=4 can be judged and the number of method calls=3 can also be judged, the remaining time=1 second of the item corresponding to the number of method calls=3 of the entry corresponding to the model number=4 in the model table 206 is obtained. Then, the remaining time=1 is the response upon the enquiry request of the remaining time.

Meanwhile, according to the nature of the process type branching tree 501, the later the enquiry request of the remaining time upon the execution in the target thread, the smaller the number of candidates for the method call sequences that have a possibility to be executed after that. For this reason, since as the value of the model number that can be judged upon the enquiry request of the remaining time becomes larger, the degree of averaging of the remaining time becomes smaller, it becomes possible to calculate the accurate remaining time. However, even if the enquiry request for the remaining time is issued at an early point of time of execution in the target thread, in the present embodiment, it becomes possible to calculate the accurate remaining time as the average value obtained from a plurality of sets of method call sequences that have a possibility to be executed after that.

Here, the history analysis unit 205 in FIG. 2 refers to the process type branching tree 501 for generating a model number transition table 207 described later, and registers the model number that is executed immediately before each model number in the "Immediately-before model number" item of the entry of each model number in the model number table 206. For example, in the "Immediately-before model number" item of the entry of the model number=2 in the model table 206, the model number=1 immediately before the model number=2 is registered. In addition, in the "Immediately-before model number" item of the entry of the model number=3, the model number=2 immediately before the model number=2 is registered. In the "Immediately-before model number" item of the entry of the model number=4, the model number=2 immediately before the model number=2 according to the process type branching tree 501 is also registered. Meanwhile, since the model number=1 is the top model number, the "Immediately-before" item of the entry of the model number=1 becomes unregistered.

Lastly, the history analysis unit 205 in FIG. 2 obtains the transition relationship between the model numbers, for each method, based on the registered contents in the "Immediately-before model number" in the model table 206, and writes the transition relationship into the model number transition table 207 whose storage area is secured on a memory.

FIG. 9 is an illustration diagram of the generation process and a data configuration example of the model number transition table 207 in the first embodiment. The history analysis unit 205 first identifies, in the model table 206 in FIG. 8, the method name=A registered in the "Method name" of the entry of the first model number=1. Regarding the method name=A, the "Immediately-before" item of the entry of the model number=1 is unregistered. As a result, the history analysis unit 205 generates the first entry corresponding to the method A in the model number transmission table 207. Then, in the "Method" item of the entry, the method name of the method A (represented as "methodA" in the drawing) is registered. In addition, in the "Model number transition" item of the entry, the transition relationship "*->1" is registered. In this transition relationship, "*" indicates the unregistered state, and "1" represents the model number=1. In addition, "->" indicates that the model number transits from the item presented on the left side to the item presented on the right side of the arrow. That is, "*->1" indicates that, when the method that is currently being executed in the thread is A, if the immediately-before model number if unregistered, the current model number is shifted to 1. This indicates that, on the process type branching tree 501 illustrated in FIG. 7 for example, when the current method A is the method corresponding to the model number that is executed first, the model number of the current thread should be shifted to 1.

Next, the history analysis unit 205 identifies, in the model table 206 in FIG. 8, the method name=B registered in the "Method name" of the entry of the second model number=2. The method name=B is further registered in the "Method name" item of the entry of the model number=3 in the model table 206. Therefore, the history analysis unit 205 refers to the "Immediately-before model number" item of each entry of the model number=2 and the model number=3. In the "Immediately-before model number" item for the model number=2, the model number=1 is registered. Meanwhile, in the "Immediately-before model number" item for the model number=3, the model number=2 is registered. As a result, the history analysis unit 205 generates the second entry corresponding to the method B in the model number transition table 207. Then, in the "Method" item of the entry, the method name of the method B (represented as "methodB" in the drawing) is registered. In addition, in the "Model number transition" item of the entry, the transition relationship "1->2, 2->3" is registered. The transition relationship "1->2" indicates that when the method that is currently being executed in the thread is B, and if the immediately-before model number is 1, the current model number is shifted to 2. This indicates that, on the process type branching tree 501 illustrated in FIG. 7, for example, if the state in which the method A with the model number=1 was executed has currently shifted to the state in which the method B is being executed, the model number of the current thread should be shifted to 2. In addition, transition relationship "2->3" indicates that when the method that is currently being executed in the thread is B, and if the immediately-before model number is 2, the current model number is shifted to 3. This indicates that, on the process type branching tree 501 illustrated in FIG. 7, for example, if the state in which the methodB with the model number=2 was executed has shifted to the state in which the method B is also currently being executed, the model number of the current thread should be shifted to 3.

Next, the history analysis unit 205 identifies, in the model table 206 in FIG. 8, the method name=B registered in the "Method name" item of the entry of the third model number=3, but skips the method B as it has already been processed. As a result, the history analysis unit 205 identifies, in the model table 206 in FIG. 8, the method name=E registered in the "Method name" item of the entry of the fourth model number=4. The history analysis unit 205 refers to the "Immediately-before model number" item in the entry of the model number=4. In the "Immediately-before model number" item for the model number=4, the model number=2 is registered. As a result, the history analysis unit 205 generates the third entry corresponding to the method E in the model number transition table 207. Then, in the "Method" item of the entry, the method name of the method E (represented as "methodE" in the drawing) is registered. In addition, in the "Model number transition" item of the entry, the transition relationship "2->4" is registered. The transition relationship "2->4" indicates that when the method that is currently being executed in the thread is E, and if the immediately-before model number is 2, the current model number is shifted to 4. This indicates that, on the process type branching tree 501 illustrated in FIG. 7, for example, if the state in which the method B with the model number=2 was executed has currently shifted to the state in which the method E is being executed, the model number of the current thread should be shifted to 4.

As described above, by the processing by the history analysis unit 205 in FIG. 2, with respect to the enquiry request of the remaining time, the model table 206 for obtaining the remaining time according to the model number and the number of method calls to respond may be generated. In addition, by the processing by the history analysis unit 205 in FIG. 2, the model number transition table 207 for obtaining the current model number upon referring to the model table 206 may be generated.

Next, the operation of the process type dynamic determination code insertion unit 208 in FIG. 2 is described more specifically.

First, the process type dynamic determination code insertion unit 208 embeds a program code to secure the thread local variable area illustrated in FIG. 3 into the program code of the method that is executed first upon receiving a request in the Web application code 201.

Figure 10:
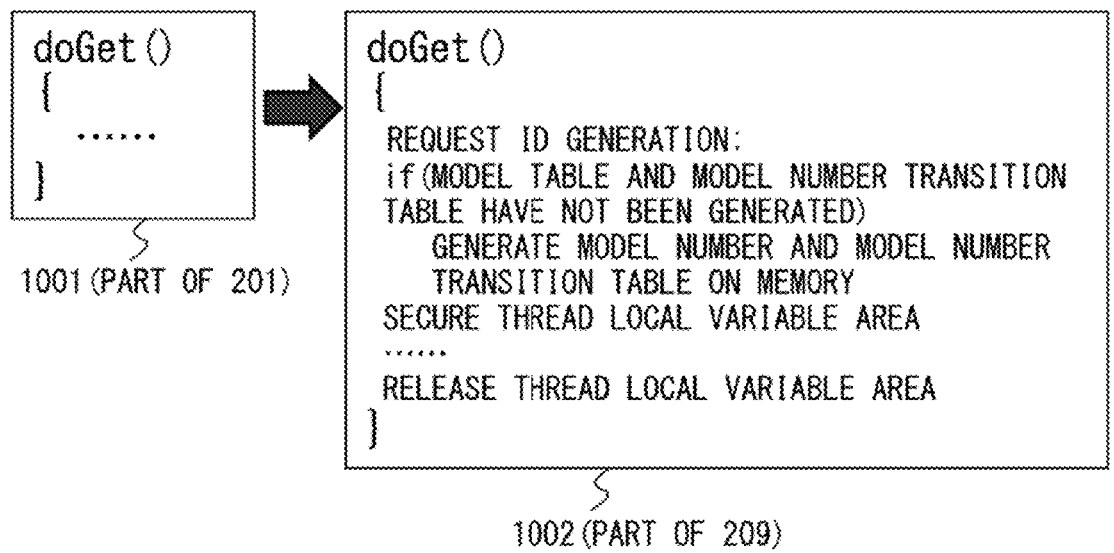
FIG. 10 is an illustration diagram of a program code embedding process to secure the thread local variable area in the first embodiment.

FIG. 10 is an illustration diagram of the embedding process of the program code to secure the thread local variable area in the first embodiment. Now, a case is considered in which the Web application code 201 is a server program called Servlet that is described in the Java program language for example. In this case, the method that is executed first when a request having a request ID is received from the client computer 101 in FIG. 1 is a top level routine called "doGet( )" or "duPost( )". The "doGet( )" is a routine to receive data in the request format called Get access by HTTP (hyper text transfer protocol) from the client computer 101 in FIG. 1. The "duPost( )" is a routine to receive data in the request format called Post access by HTTP (hyper text transfer protocol). In the case of HTTP, from the client computer 101 to the server computer 102 in FIG. 1, the request is transmitted in either of the data format Get access or Post access. The description is made with the example of doGet( ) method. Meanwhile, the same applies to the case of doPost( ) method. In FIG. 10, 1001 is a program code example of the doGet( ) method, which is a part of the Web application code 201 in FIGS. 2, and 1002 is the doGet( ) method program code after conversion of the doGet( ) method program code 1001 by the process type dynamic determination code insertion unit 208, which is a part of the Web application 209 to dynamically determine the process type in FIG. 2. The process type dynamic determination code insertion unit 208 embeds a program code to generate a request ID (when no request ID is assigned), just before the line that is executed first in the program code of the doGet( ) method. Next, if the model table 206 and the model number transition table 207 have not been registered yet, a program code to generate them on the memory is embedded. Further, next, a program code to secure the thread local variable area is embedded. The thread local variable area corresponds to the thread local variable table 302 that is referred to from the thread local variable management table 301 in FIG. 3. By this program code, first, the entry of the request ID is generated on the thread local variable management table 301. Next, the request ID value is registered in the "Request ID method call" item of the entry. Further, after the storage area of the thread local variable table 302 is secured on the memory, the pointer to the top address of the storage area is registered in the "Reference to thread local variable table" item of the entry on the thread local variable management table 301. The process type dynamic determination code insertion unit 208 embeds a program code to release the thread local variable area of the thread corresponding to the request ID, just after the line that is executed last in the program code of the doGet( ) method. By the program code, when all the method call sequences in the tread are completed and the doGet( ) method of the top level routine terminates the process, the thread local variable area that has been secured corresponding to the thread is released. Specifically, by the program code, the storage area of the corresponding thread local variable table 302 in FIG. 3 is released, and the entry corresponding to the corresponding request ID on the thread local variable management table 301 is deleted.

Next, the process type dynamic determination code insertion unit 208 automatically generates a model judgment code to judge and update the model number and embeds it into the top of the program code of each method corresponding to each model number in the Web application 201.

FIG. 11 is an illustration diagram of the embedding process of the model judgment code to update the model number in the first embodiment. As described above, in the model number transition table 207, in the entry corresponding to the method B for example, by the history analysis unit 205, "1->2" and "2->3" are registered as the transition relationship among the model numbers. Corresponding to this, the process type dynamic determination code insertion unit 208 embeds a model judgment code as described in 1102, to the program code 1101 of the method B being a part of the Web application code 201 in FIG. 2. As a result, the process type dynamic determination code insertion unit 208 generates the program code 1102 of the method B as a part of the Web application code to dynamically determine the process type.

In the program code 1102, immediately before the first program code that is executed first in the method B, a model judgment code "if (MODELID==1)MODELID=2;" is embedded. This model judgment code refers to the MOEDLID value being the value of the MOEDLID variable in the thread local variable table 302 from the thread local variable management table 301 in FIG. 3. Then, when the MOEDLID value is 1, 2 is assigned to the MOEDLID value. The model judgment code realizes the operation of the transition relationship "1->2". That is, it is a model code to, in the case in which the method that is currently being executed on the thread is B and if the immediately-before MOEDLID value in the thread local variable table 302 is 1, set the MOEDLID value to 2 to shift the current model number to 2. This corresponds to the execution of the method B with the model number=2 in the second layer in FIG. 7 for example.

In the program code 1102, following the model judgment code in the first line described above, a model judgment code "else if (MODELID==2) MODELID=3;" is embedded. This model judgment code assigns, when the MOEDLID value in the thread local variable table 302 is 2, 3 to the MOEDLID value. The model judgment code realizes the operation of the transition relationship "2->3". That is, it is a model code to, in the case in which the method that is currently being executed on the thread is B and if the immediately-before MOEDLID value in the thread local variable table 302 is 2, set the MOEDLID value to 3 to shift the current model number to 3. This corresponds to the execution of the method B with the model number=3 in the third layer in FIG. 7 for example.

In the program code 1102, following the model judgment code in the second line described above, a program code "else {/*Do nothing */}" is embedded. This program indicates that if neither of the conditions of the first line and the second line is satisfied, an empty process is executed, that is, nothing is executed. Meanwhile, the description "/* Do nothing */" is a comment sentence in the program code, and does not affect the execution of the program code.

In FIG. 11, regarding the method A and the method E registered in the model number transition table 207, while not particularly illustrated in the drawing, in the same manner as in the case of the method B, a model judgment code to update the model number is embedded into the program code of each method. As described above, in the model number transition table 207 generated on the memory, in the entry corresponding to the method A for example, by the history analysis unit 205, "*->1" has been registered as the transition relationship of the model numbers. Corresponding to this, the process type dynamic determination code insertion unit 208 converts the Web application code 201 in FIG. 2 into the Web application code 209 to dynamically determine the process type, regarding the program code of the method A. In the program code, immediately before the first program code executed in the method A, a model judgment code "unless(MODELID) MODELID=1;" for example is embedded. The model judgment code assigns, when the MOEDLID value is in the thread local variable table 302 is 0 or unregistered, 1 to the MOEDLID value. The model judgment code realizes the operation of the transition relationship "*->1". That is, it is a model code to, in the case in which the method that is currently being executed on the thread is A and if the MOEDLID value in the thread local variable table 302 is 0 or unregistered, set the MOEDLID value to 1 to shift the current model number to 1. This corresponds to the execution of the method B with the model number=3 in the third layer in FIG. 7 for example. Meanwhile, in the model number transition table 207 in FIG. 11, in the entry corresponding to the method E for example, by the history analysis unit 205, "2->4" has been registered as the transition relationship of the model numbers. Corresponding to this, the process type dynamic determination code insertion unit 208 converts the Web application code 201 in FIG. 2 into the Web application code 209 to dynamically determine the process type, regarding the program code of the method E. In the program code, immediately before the first program code executed in the method E, a model judgment code "if(MODELID==2) MODELID=4;" for example is embedded. The model judgment code assigns, when the MOEDLID value is in the thread local variable table 302 is 2, 4 to the MOEDLID value. The model judgment code realizes the operation of the transition relationship "2->4". That is, it is a model code to, in the case in which the method that is currently being executed on the thread is E and if the MOEDLID value in the thread local variable table 302 is 2, set the MOEDLID value to 4 to shift the current model number to 4. This corresponds to the execution of the method B with the model number=4 in the third layer in FIG. 7 for example.

The Web application code 209 to dynamically determine the process type obtained by the process type dynamic determination code insertion unit 208 in FIG. 2 as described above is executed instead of the Web application code 201 when a request from the user computer in FIG. 1 is received. As a result, it becomes possible to understand, for example, in the thread that is currently being executed, up to which model number in the process type branching tree 501 in FIG. 7 the current method has been executed, as the MOEDLID value in the thread local variable table 302 (thread local variable area).

As described above, in the first embodiment, it becomes possible to constantly understand up to which model number the methods have been executed in the thread that is currently being executed. Together with this, by understanding the number of calls in the thread that is currently being executed according to the second embodiment described later, it becomes possible to obtain the remaining time of the process in the thread that is currently being executed, by referring to the model table 206 generated as in FIG. 8. As described later in the second embodiment, for the NCALL variable of the thread local variable table 302 (thread local variable area) in FIG. 3, as the NCALL value, the number of calls in the thread that is currently being executed is obtained. When an enquiry request of the remaining time is received from the client computer 101 in FIG. 1 while specifying a request ID, with the thread local variable management table 301 in FIG. 3 being accessed according to the request ID, the corresponding thread local variable table 302 is referred to. As a result, the MOEDLID value and the NCALL value are read out from the thread local variable table 302. Then, in the model table 206, the remaining time registered in the item of the number of method calls corresponding to the NCALL value of the entry line of the model number corresponding to the MOEDLID value is obtained and returned to the client computer 101. For example, it is assumed that the MOEDLID value=4, NCALL value=3 are obtained from the thread local variable table 302. In this case, the remaining time=1 second corresponding to the item of the number of method calls=3 in the entry line corresponding to the model number=4 on the model table 206, and is returned to the client computer 101.

As described above, in the first embodiment, there is no need to know the process type in advance to respond with the remaining time, and it becomes possible to automatically obtain the process type corresponding to the thread that is currently being executed as the model number and to respond with an appropriate remaining time.

Figure 12:
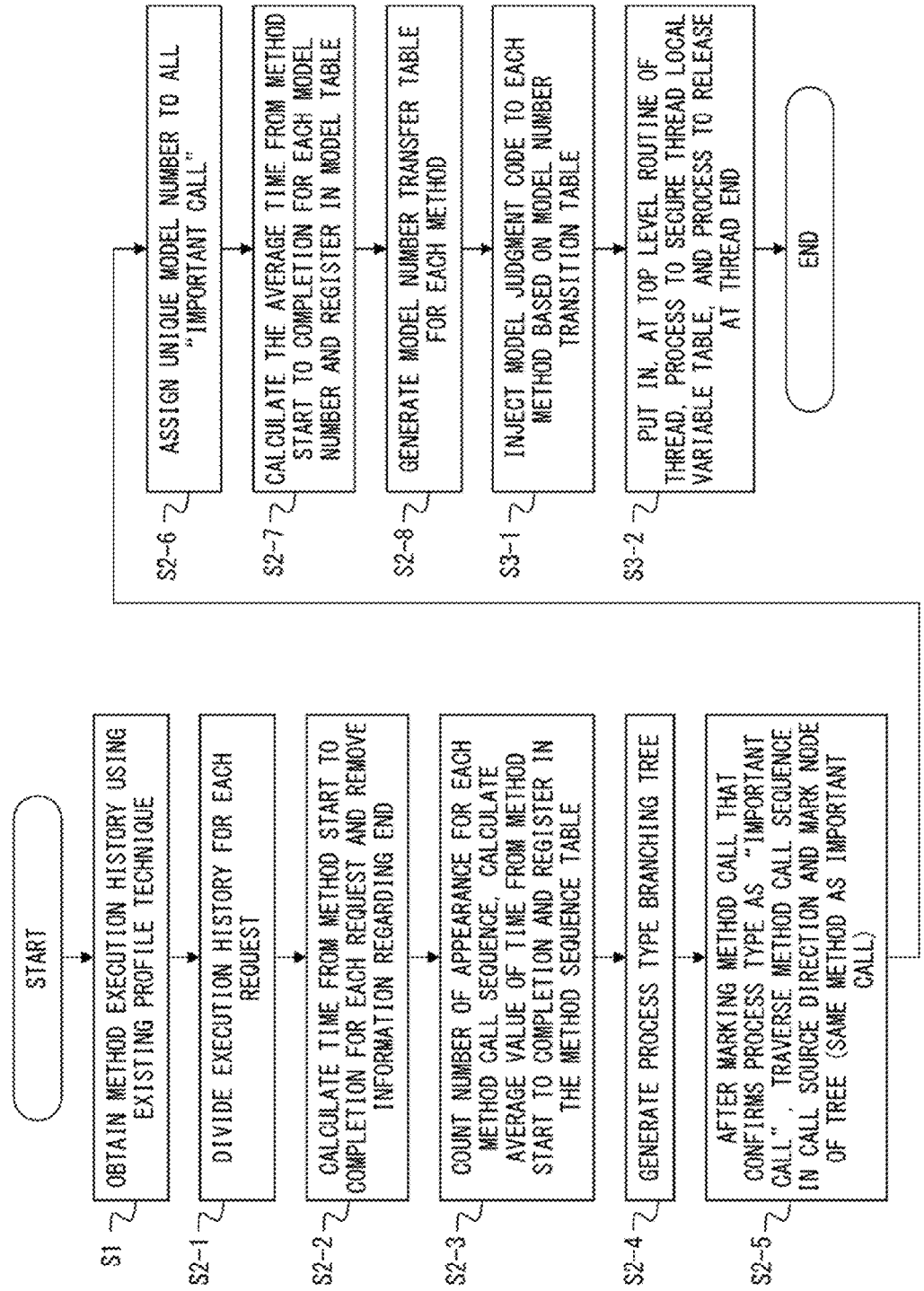
FIG. 12 is a flowchart illustrating a history analysis process and a process type dynamic determination code inserting process in the first embodiment.

FIG. 12 is a flowchart illustrating the control process of the system of the first embodiment illustrated by the functional block in FIG. 2. The flowchart is a process in which, in the hardware configuration of the server computer 102 (FIG. 1) described later for example in FIG. 37, a CPU (central processing unit) 3701 loads a control program stored in an external storage apparatus 3705 onto a memory 3702 and executes it.

First, step S1 is a process of the execution history acquisition code conversion unit 202 in FIG. 2. Here, using an existing profile technique, the execution history 204 of the method illustrated in FIG. 2 is obtained.

Next, step S2-1 through S2-8 are processes corresponding to the process of the history analysis unit 205 in FIG. 2.

First, the execution history 204 in FIG. 2 is divided for every request, that is, for every thread ID (request ID) (step S2-1).

Next, the remaining time from the start of the method to the completion of the thread is calculated for every request, and information regarding the termination is removed (step S2-2).

Next, as illustrated in FIG. 4, the number of appearance is counted for every method call sequence extracted from the execution history 204. Then, as described above, for every method corresponding to the number of method calls in the sequence, the average value of the time from the start of each method to the completion is calculated and registered in the method sequence table 401 in FIG. 4 (step S2-3).

Next, the process type branching tree 501 described in FIG. 5 is generated (step S2-4).

Next, as illustrated in FIG. 6, the method call that confirms the process type is marked as the "important call". After that, each node is traversed along the method call sequence of the process type branching tree 501 from each marked important call to the start node direction. Then, the node of the same method as the important call and the start node are further marked as the important call (step S2-5 is as described above).

Next, as illustrated in FIG. 7, a unique model number is assigned to all the "important calls" (step S2-6).

Next, as illustrated in FIG. 8, for each model number, the average remaining time from the start of the method to the completion is calculated and registered in the model table 206 (step S2-7).

Lastly, as described in FIG. 9, for every method, the transition relationship between the model numbers are obtained and written into the model number transition method table 207 (step S2-8).

Next, step S3-1 and S3-2 are processes corresponding to the function of the process type dynamic determination code insertion unit 208 in FIG. 2.

First, as described in FIG. 11, based on the model number transition table 207, to the top of the program code of each method corresponding to each model number in the Web application code 201, a model judgment code to judge and update the model number is automatically generated and embedded (step S3-1).

Then, as described in FIG. 10, to the top of the thread of the top level routine, the process to secure the thread local variable table 302 at the time of the start of the thread, and a program code to release the thread local variable table 302 at the time of the termination of the thread are embedded (step S3-2).

Figure 13:
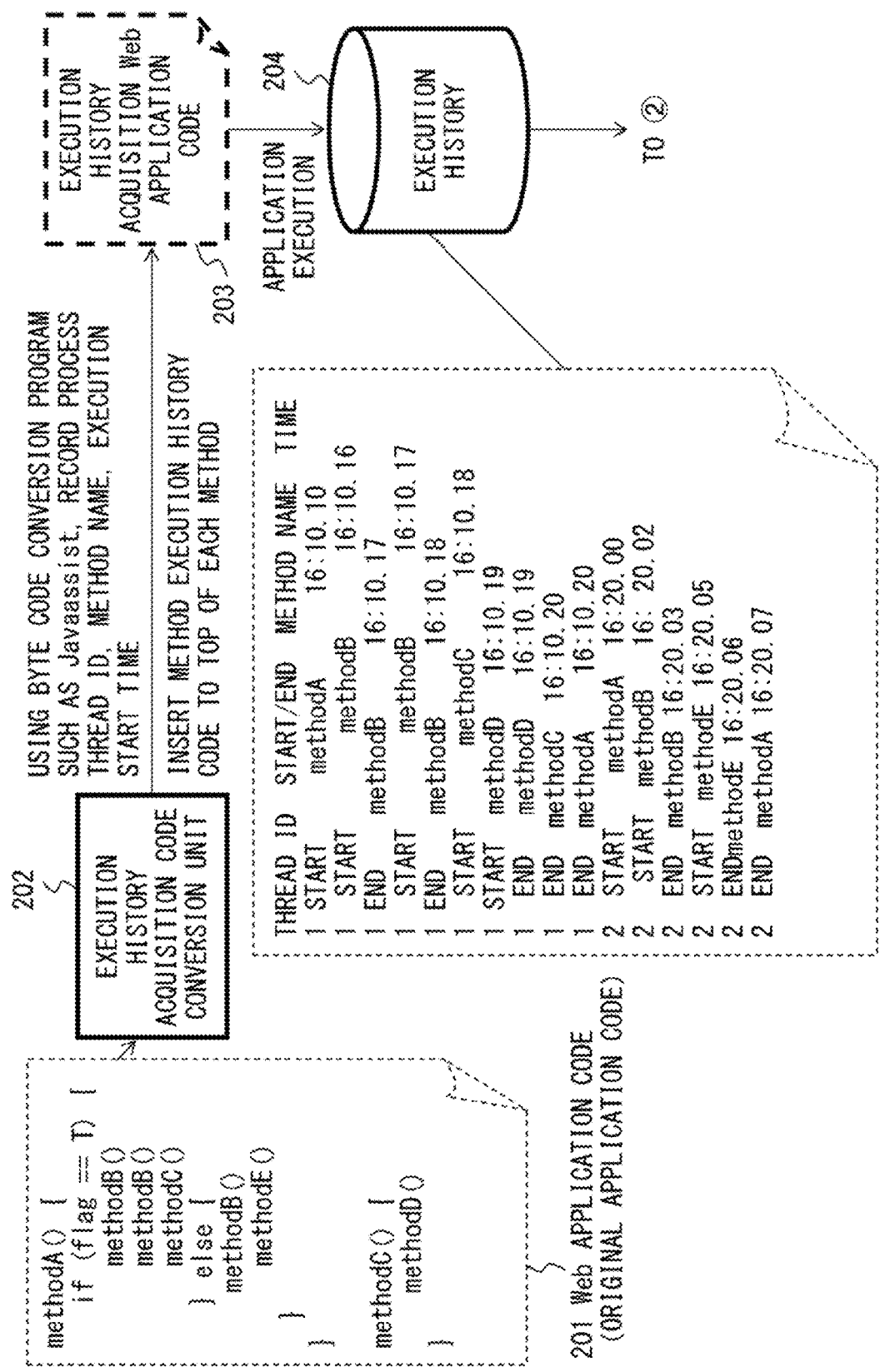
FIG. 13 is an illustration diagram of the process in step S1 in FIG. 12.

FIG. 13 is an illustration diagram of the process in step S1 in FIG. 12. Now, it is assumed that, as the Web application code 201 that is an original code, there is a program code illustrated in FIG. 13.

In this program code, the process branches according to whether the value of a variable flag is true (=T) or false, in the program code methodA of the method A for example. If the value of the variable flag is true (⌈if (flag=T⌋), the program code methodB of the methodB, followed by the same methodB, and the program code methodC of the method C are executed. This corresponds to the sequence part "A-B-B-C" in the method call sequence "A-B-B-C-D" described above in FIG. 4. If the value of the variable flag is true (=T) (⌈ ⌋else { ⌋), the method B, followed by the program code methodE of the method E are executed. This corresponds to the method call sequence "A-B-E" described above in FIG. 4. Further, in the program code methodC of the method C, the program code methodD of the method D is executed in it. This corresponds to the sequence part "C-D" of the method call sequence "A-B-B-C-D" described above in FIG. 4.

The execution history acquisition code conversion unit 202 in FIG. 2 embeds a program code to obtain the execution history 204 to the top of the program code of each method in the Web application code 201 described above, and converts it into an execution history acquisition Web application code 203. The execution history acquisition Web application code 203 uses a byte code conversion program called such as Javaassist for example, and records the process thread ID, the distinction of the execution start/execution termination, the method name, the time and the like as the execution history 204. In the example in FIG. 13, the methodA of the thread ID=1 started execution at 16:10:10 (16:10 and 10 seconds). Next, the methodB of the thread ID=1 started execution at 16:10:16. Next, the methodB of the thread ID=1 terminated execution at 16:10:17. Next, the methodB of the thread ID=1 started execution at 16:10:17. Next, the methodB of the thread ID=1 terminated execution at 16:10:18. Next, the methodC of the thread ID=1 started execution at 16:10:18. Next, the methodD of the thread ID=1 started execution at 16:10:19. Next, the methodD of the thread ID=1 terminated execution at 16:10:19. Next, the methodC of the thread ID=1 terminated execution at 16:10:20. Then, the methodA of the thread ID=1 terminated execution at 16:10:20. Meanwhile, the methodA of the thread ID=2 started execution at 16:20:

00. Next, the methodB of the thread ID=2 started execution at 16:20:02. Next, the methodB of the thread ID=2 terminated execution at 16:20:03. Next, the methodE of the thread ID=2 started execution at 16:20:05. Next, the methodE of the thread ID=2 terminated execution at 16:20:06. Next, the methodA of the thread ID=2 terminated execution at 16:20:07.

FIG. 14 is an illustration diagram of the process of step S2-1. Here, for every request, that is, for every thread ID (request ID), the execution history 204 obtained as illustrated in FIG. 13 is divided as presented as execution histories 1401 and 1402 in FIG. 14 for example.

FIG. 15 is an illustration diagram of the process of step S2-2 in FIG. 12. Here, in each of the execution history 1401 and 1402 divided as in FIG. 14, the start time of each method is subtracted from the termination time of the last method. As a result, for each method for each thread ID (request ID), the remaining time from the start of each method to the completion of the thread is calculated and obtained as presented in the remaining time list 1501 or 1502 in FIG. 15. In the remaining time list 1501 in FIG. 15, the remaining time 10 seconds, 4 seconds, 2 seconds and 1 second is calculated for the method A, B, B, C, D, respectively. In the remaining time list 1502 in FIG. 15, the remaining time 7 seconds, 5 seconds, 1 second is calculated for the method A, B, E, respectively.

Figure 16:
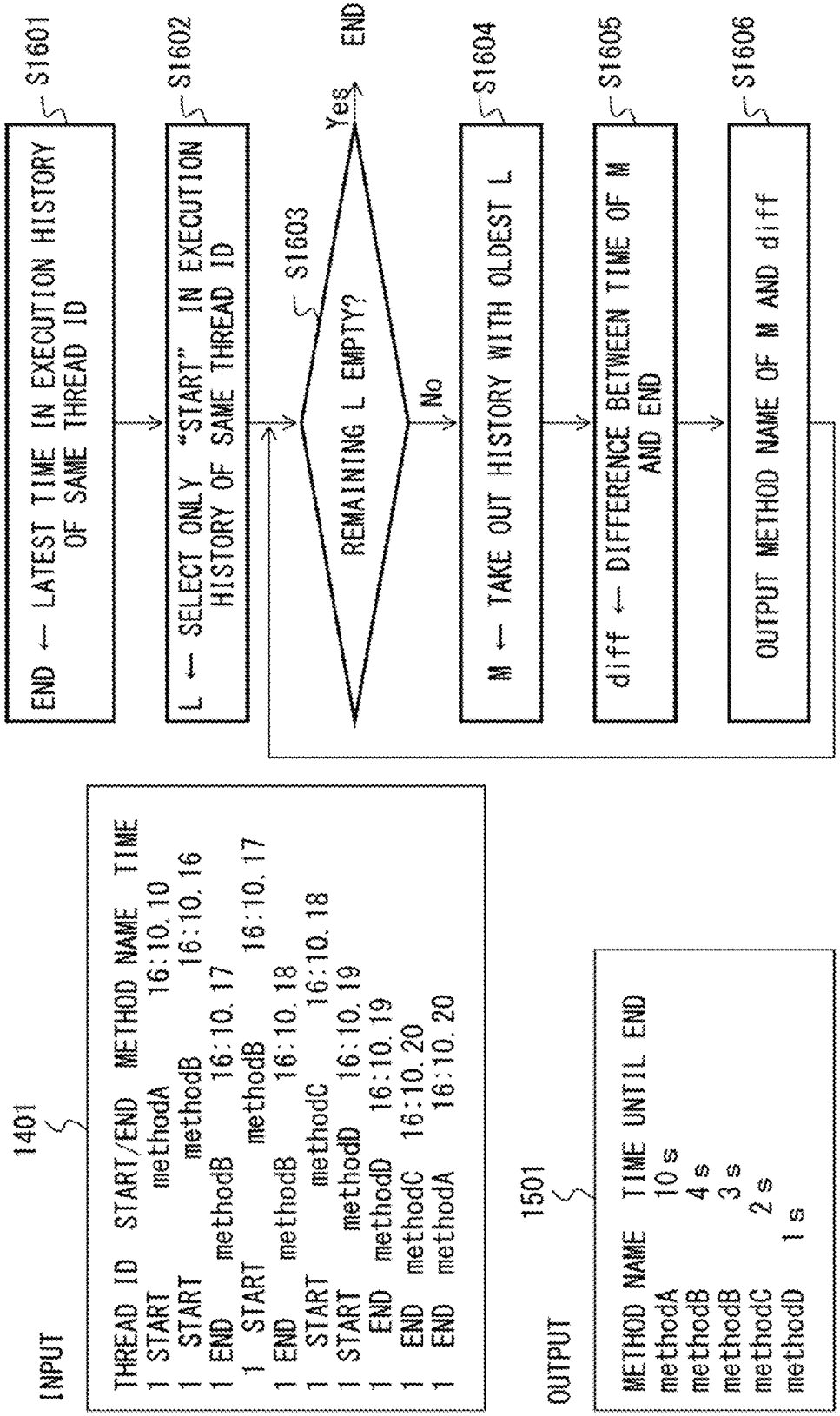
FIG. 16 is a flowchart illustrating the detail process in step S2-2 in FIG. 12.

FIG. 16 is a flowchart illustrating the detail process of step S2-2 in FIG. 12. Here, explanation is made with an example of the process to calculate the remaining time list 1501 corresponding to the thread ID=1 in FIG. 15 from the execution history 1401 for the thread ID=1 in FIG. 14.

First, to a variable END on the memory, the latest time in the execution histories of the same thread ID is assigned (step S1601). In the input example of the execution history 1401 illustrated in FIG. 16, the time 16:10:20 is assigned to the variable END.

Next, among the execution histories of the same thread ID, only the histories in which "start" indicating the execution start is stored as the distinction of the execution start/execution termination are selected, and those selected histories are assigned to a variable L on the memory (step S1602). In the input example of the execution history illustrated in FIG. 16, the following group histories is assigned to the variable L as a list, which is (methodA, 16:10:10), (methodB,16:10:16), (methodB,16:10:17), (methodC,16:10:18), (methodD,16:10:19).

Next, whether the remaining content (list) of the variable L has become empty or not is determined (step S1603).

As long as the content (list) of the variable L becomes empty, the judgment in step S1603 becomes No, and with one set of history being taken out from the variable L, processes of the following step S1604 through S1606 are executed repeatedly.

First, the oldest (the earliest in terms of time) history is taken out from the variable L, and assigned to a variable M on the memory (step S1604). In the input example of the execution history 1401 illustrated in FIG. 16, as the first one, (methodA, 16:10:10) is assigned to the variable M.

Next, the difference between the time in the variable M and the time in the variable END is calculated, and assigned to diff on the memory (step S1605). In the example of the first one described above, the difference=10 seconds between the time "16:10:10" in the variable M and the time "16:10:20" in the variable END is assigned to the variable diff.

Then, the method name in the variable M and the content of the variable diff are output to the remaining time list 1501 of the remaining time. In the example of the first one described above, (methodA, 10 seconds) is output to the remaining time list 1501.

Next, since the list still remains in the variable L, the judgment in step S1603 becomes No. As a result, as the second one, (methodB, 16:10:16) is taken out and assigned to the variable M in step S1604, and the difference=4 seconds between the time 16:10:16 and 16:10:20 is calculated and assigned to the variable diff in step S1605. Then, (methodB, 4 seconds) is output to the remaining time list 1501 in step S1606.

Next, since the list is still left in the variable L, the judgment in step S1603 becomes No. As a result, as the third one, (methodB, 16:10:17) is taken out and assigned to the variable M in step S1604, and the difference=3 seconds between the time 16:10:17 and 16:10:20 is calculated and assigned to the variable diff in step S1605. Then, (methodB, 3 seconds) is output to the remaining time list 1501 in step S1606.

Next, since the list is still left in the variable L, the judgment in step S1603 becomes No. As a result, as the fourth one, (methodC, 16:10:18) is taken out and assigned to the variable M in step S1604, and the difference=2 seconds between the time 16:10:18 and 16:10:20 is calculated and assigned to the variable diff in step S1605. Then, (methodC, 2 seconds) is output to the remaining time list 1501 in step S1606.

Further, since the list is still left in the variable L, the judgment in step S1603 becomes No. As a result, as the fifth one, (methodC, 16:10:19) is taken out and assigned to the variable M in step S1604, and the difference=1 second between the time 16:10:19 and 16:10:20 is calculated and assigned to the variable diff in step S1605. Then, (methodD, 1 second) is output to the remaining time list 1501 in step S1606.

After that, since no list is left in the variable M, the judgment in step S1603 becomes Yes, and the process in step S202 in FIG. 12 is terminated. Meanwhile, the same process is executed for other thread IDs (for example, the execution history 1402 for the thread ID=2 and the remaining time list 1502 in FIG. 14, FIG. 15).

Using the remaining time lists 1501, 1502 and the like for each thread ID obtained as described above, in step S2-3 in FIG. 12, the method sequence table 401 is generated. Here, first, with one remaining time list, for example 1501 in FIG. 15 being referred to, the method sequence A-B-B-C-D is extracted and registered in the "method sequence" item of one entry in the method sequence table in FIG. 4. Next, 1 is registered in the "number of appearance" item of the above entry in the method sequence table 401. Further, in item of the remaining time for each number of method calls 1-5 in the above entry in the method sequence table 401, the remaining time sequence 10 seconds, 4 seconds, 3 seconds, 2 seconds and 1 second in the remaining time list 1501 is respectively registered for example. If the same remaining time list as for the above method sequence "A-B-B-C-D" has been obtained as the remaining list, the content of the "number of appearance" item of the above entry in the method sequence table 401 is incremented. In addition, in the item of the remaining time of each number of method calls 1-5 of the above entry, the average value of the remaining time for each number of method calls for the obtained number of appearance is calculated and registered. For other remaining time list, such as 1502, an entry for another method call sequence "A-B-E" is generated in the method sequence table 401, and the remaining time is registered in the same manner as described above.

FIG. 17 is a flowchart illustrating the detail process of step S2-4 in FIG. 12. Here, the process type branching tree 501 is generated. Details of the process are explained using the illustration diagrams FIG. 18(a)-FIG. 18(f).

Figure 18:
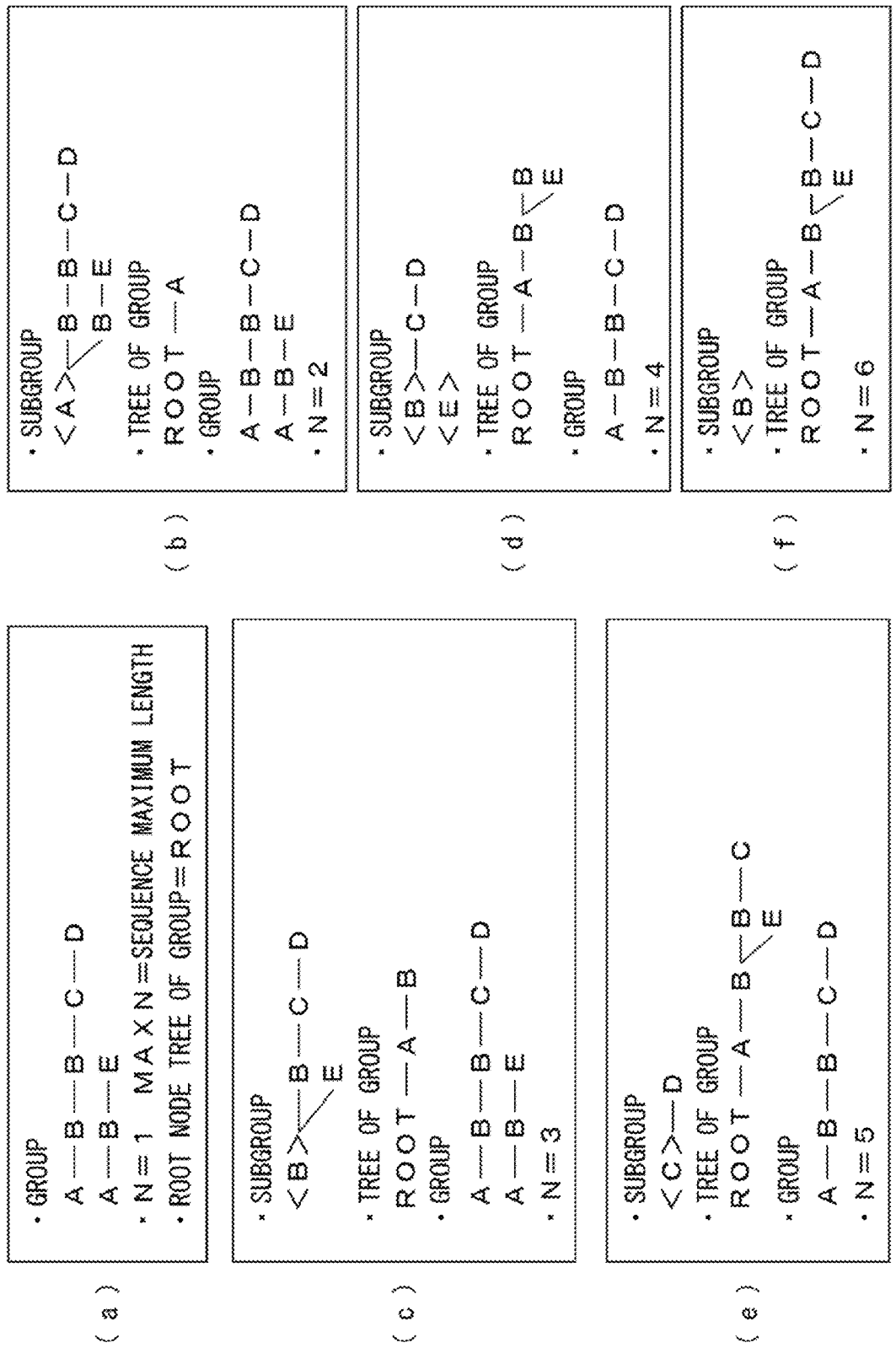
FIG. 18 is an illustration diagram of the process in step S2-4 in FIG. 12.

First, all the method call sequences obtained in the method sequence table 401 as illustrated in FIG. 4 are made into one group. Specifically, for example, the character sequence of the method call sequences is stored in the list variable cluster that keeps the information of the group. In the example of the method sequence table 401 in FIG. 4, as illustrated in FIG. 18(*a*), the method call sequences "A-B-B-C-D" and "A-B-E" are made into a group. Meanwhile, as illustrated in FIG. 18(*a*), the value 1 is assigned to the variable N on the memory representing the process layer of the process type branching tree 501. Next, in the variable MAXN on the memory that keeps the maximum length of the variable N, the maximum method length among the methods call sequences registered in the method sequence table 401. In the example of the method sequence table 401, the method call sequence "A-B-B-C-D" is the longest and its number of methods is 5. Therefore, the variable MAXN=5 is set. Further, as illustrated in FIG. 18(*a*), the character sequence 'ROOT' is registered as the root node of the tree of the group. The data of the tree is kept as the list variable sequence on the list (step S1701 in FIG. 17 is as described above).

Next, whether the value of N is equal to or below MAXN is judged (step S1702 in FIG. 17).

If the judgment in step S1702 is Yes as the value of N is equal to or below MAXN, the following series of processes are executed.

First, for each method call sequence in the group, according to the N-th method name, the partial sequences below it are sorted into subgroups (step S1704 in FIG. 17). The information of the subgroup is kept using the list variable cluster on the memory for example. In the example of the initial state in FIG. 18(*a*), with the N=1st method name "A" of the method sequences "A-B-B-C-D" and "A-B-E" being the top, one subgroup including the partial sequences "A-B-B-C-D" and "A-B-E" is made.

Next, the top methods of each subgroup are set as the root node of each subgroup (step S1705 in FIG. 17). In the state in FIG. 18(*b*), the top method "A" of the subgroup consisting of the partial sequences "A-B-B-C-D" and "A-B-E" is set as the root node of the subgroup.

Next, the root node of each subgroup is set as the child node of the terminal node of the tree of the current group (step S1706 in FIG. 17). In the state in FIG. 18(*b*), for the route node 'ROOT' (see FIG. 18(*a*)) of the tree of the current group, the root node "A" of the one subgroup mentioned above is registered as the child node. As a result, as illustrated in FIG. 8(*b*), the tree of the group becomes "ROOT-A".

Next, as a new group, all the method sequences in which the partial sequences other than the top node of the subgroup mentioned above are included are registered, and +1 is performed for the value of the variable N (step S1707 in FIG. 17). In the state of FIG. 18(*b*), the method call sequence partial sequences "A-B-B-C-D" and "A-B-E" including the partial sequences "B-B-C-D" and "B-E" other than the top node "A" are made into a new group. In addition, the variable N=2 is set.

Next, whether or not the value of N is equal to or below MAXN is judged again (step S1702) in FIG. 17. In the state in FIG. 18(*b*), since N=2, the judgment in step S1702 becomes Yes, and the series of processes from step S1704 to S1707 are executed again. The change from the state in FIG. 18(*b*) to the stage in FIG. 18(*c*) is as follows. First, in the example of the state in FIG. 18(*b*), with the N=2nd method name "B" of the method sequences "A-B-B-C-D" and "A-B-E" in the group being the top, one subgroup including the partial sequences "B-B-C-D" and "B-E" is made. Next, in the state in FIG. 18(*b*), the top method "B" of the subgroup consisting of the partial sequences "B-B-C-D" and "B-E" is set as the root node of the subgroup. Next, in the state in FIG. 18(*b*), for the terminal node 'A' (see FIG. 18(*b*)) of the tree of the current group, the root node "B" of the one subgroup mentioned above is registered as the child node. As a result, as illustrated in FIG. 8(*c*), the tree of the group becomes "ROOT-A-B". Then, in the state of FIG. 18(*c*), the method call sequence partial sequences "A-B-B-C-D" and "A-B-E" including the partial sequences "B-C-D" and "E" other than the top node "B" are made into a new group. In addition, the variable N=3 is set.

The process proceeds, and in the state in FIG. 18(*c*), since N=3, the judgment in step S1702 becomes Yes, and the series of processes from step S1704 to S1707 are executed again. The change from the state in FIG. 18(*c*) to the stage in FIG. 18(*d*) is as follows. First, in the example of the state in FIG. 18(*c*), with the N=3rd method name "B" and "E" of the method sequences "A-B-B-C-D" and "A-B-E" in the group being the top, two subgroups are made. They are a subgroup including the partial sequence "B-C-D" and a subgroup including "E". Next, in the state in FIG. 18(*d*), the top method "B" of the subgroup consisting of the partial sequence "B-C-D" is set as the root node of the subgroup. In addition, in the state in FIG. 18(*d*), the top method "E" of the subgroup consisting of the partial sequence "E" is set as the root node of the subgroup. Next, in the state in FIG. 18(*d*), for the terminal node 'B' (see FIG. 18(*c*)) of the tree of the current group, the root nodes "B" and "E" of the two subgroup mentioned above are registered as the child node. As a result, as illustrated in FIG. 18(*d*), the tree of the group becomes "ROOT-A-B-(B or E)". Then, in the state of FIG. 18(*d*), the method call sequence partial sequence "A-B-B-C-D" including the partial sequence "C-D" other than the top nodes is made into a new group. In addition, the variable N=4 is set.

The process proceeds, and in the state in FIG. 18(*d*), since N=4, the judgment in step S1702 becomes Yes, and the series of processes from step S1704 to S1707 are executed again. The change from the state in FIG. 18(*d*) to the stage in FIG. 18(*e*) is as follows. First, in the example of the state in FIG. 18(*d*), with the N=4th method name "C" of the method sequence "A-B-B-C-D" in the group being the top, one subgroup "C-D" is made. Next, in the state in FIG. 18(*e*), the top method "C" of the subgroup consisting of the partial sequence "C-D" is set as the root node of the subgroup. Next, in the state in FIG. 18(*e*), for the terminal node of the tree of the current group, the root node of the subgroup mentioned above is registered as the child node. Now, there are two terminal nodes 'B' or 'E' of the tree of the current group, as illustrated in FIG. 18(*d*). Among these, in the method call sequence "A-B-B-C-D" in the group in which the partial sequence "C-D" of the subgroup mentioned above is included, one parent node "B" of the root node "C" of the subgroup is selected. As a result, as illustrated in FIG. 18(*e*), the tree of the group becomes "ROOT-A-B-(B-C or E)". Then, in the state of FIG. 18(*e*), the method call sequence partial sequence "A-B-B-C-D" including the partial sequence "D" other than the top node is made into a new group, and the variable N=5 is set. The process further proceeds, and in the state in FIG. 18(*e*), since N=5, the judgment in step S1702 becomes Yes, and the series of processes from step S1704 to S1707 are executed again. The change from the state in FIG. 18(*e*) to the stage in FIG. 18(*f*) is as follows. First, in the example of the state in FIG. 18(*e*), with the N=5th method name "d" of the method sequence "A-B-B-C-D" in the group being the top, one subgroup "D" is made. Next, in the state in FIG. 18(*f*), the top method "D" of the subgroup consisting of the partial sequence "D" is set as the root node of the subgroup. Next, in the state in FIG. 18(*f*), for the terminal node of the tree of the current group, the root node of the subgroup mentioned above is registered as the child node. Now, there are two terminal nodes 'C' or 'E' of the tree of the current group, as illustrated in FIG. 18(e). Among these, in the method call sequence "A-B-B-C-D" in the group in which the partial sequence "D" of the subgroup mentioned above is included, one parent node "C" of the root node "D" of the subgroup is selected. As a result, as illustrated in FIG. 18(f), the tree of the group becomes "ROOT-A-B- (B-C-D or E)". Then, in the state of FIG. 18(f), there is no longer any method all sequence partial sequence including a partial sequence other than the top node, and the variable N=6 is set.

Lastly, in the state in FIG. 18(f), since N=6>MAXN=5, the judgment in step S1702 becomes No. As a result, the tree "ROOT-A-B-(B-C-D or E)" with 'ROOT' being the start point obtained in FIG. 18(f) is output. This matches the structure of the process type branching tree 501 in FIG. 5 corresponding to the method sequence table 401 in FIG. 4. Meanwhile, in the process type branching tree 501 in FIG. 5, since there is only one root node "A", its higher-level root node 'ROOT' is omitted, but if there are a plurality of root nodes, the root node 'root' is left.

As described above, in step S2-4 in FIG. 12, the process type branching tree 501 is generated.

Next, the detail process of step S2-7 in FIG. 12 is described. Here, as described above, as described in FIG. 8, for each model number, the average remaining time from the start of the method to the completion for each number of method calls is calculated and registered in the model table 206. In order for this, on the memory, an average time calculation tale 1901 having a data structure such the one illustrated in FIG. 19(a) is generated. The structure of the average time calculation 1901 of is the same as the data structure of the model table 206 illustrated in FIG. 8. That is, the average time calculation table 1901 keeps, for each line corresponding to the model number determined in step S2-6 in FIG. 12, respective item values for the number of method calls corresponding to the longest sequence in the method sequence table 4 in FIG. 4. As these item values, the accumulated value of the remaining time for each number of method calls for each model number is registered. The initial state of those item values is all "0" as illustrated in FIG. 19(a). In the state in which the accumulation of the remaining time has all finished, in the average time calculation table 1901, as illustrated in FIG. 19(b) for example, accumulated values of the remaining time such as "85, 45, 20, 10, 5" "50, 20, 15, 10, 5" "35, 25, 5, 0, 0" are obtained. Meanwhile, in each line of the average time calculation table 1901, the value of the frequency of appearance representing the number of accumulation is registered. Its initial value is "0" as illustrated in FIG. 19(a). In the example of FIG. 19(b) after the accumulation, the frequency of appearance of the model numbers 1, 2, 3, 4 is "10" "10" "5" "5" respectively, for example. The average value of each remaining time is calculated by dividing the accumulated value of the remaining time for each model number and for each time of method call obtained as in the example of FIG. 19(b) when the accumulation finishes by the frequency of appearance for each model number. As a result, the model table 206 illustrated in FIG. 8 described above is obtained.

Figure 20:
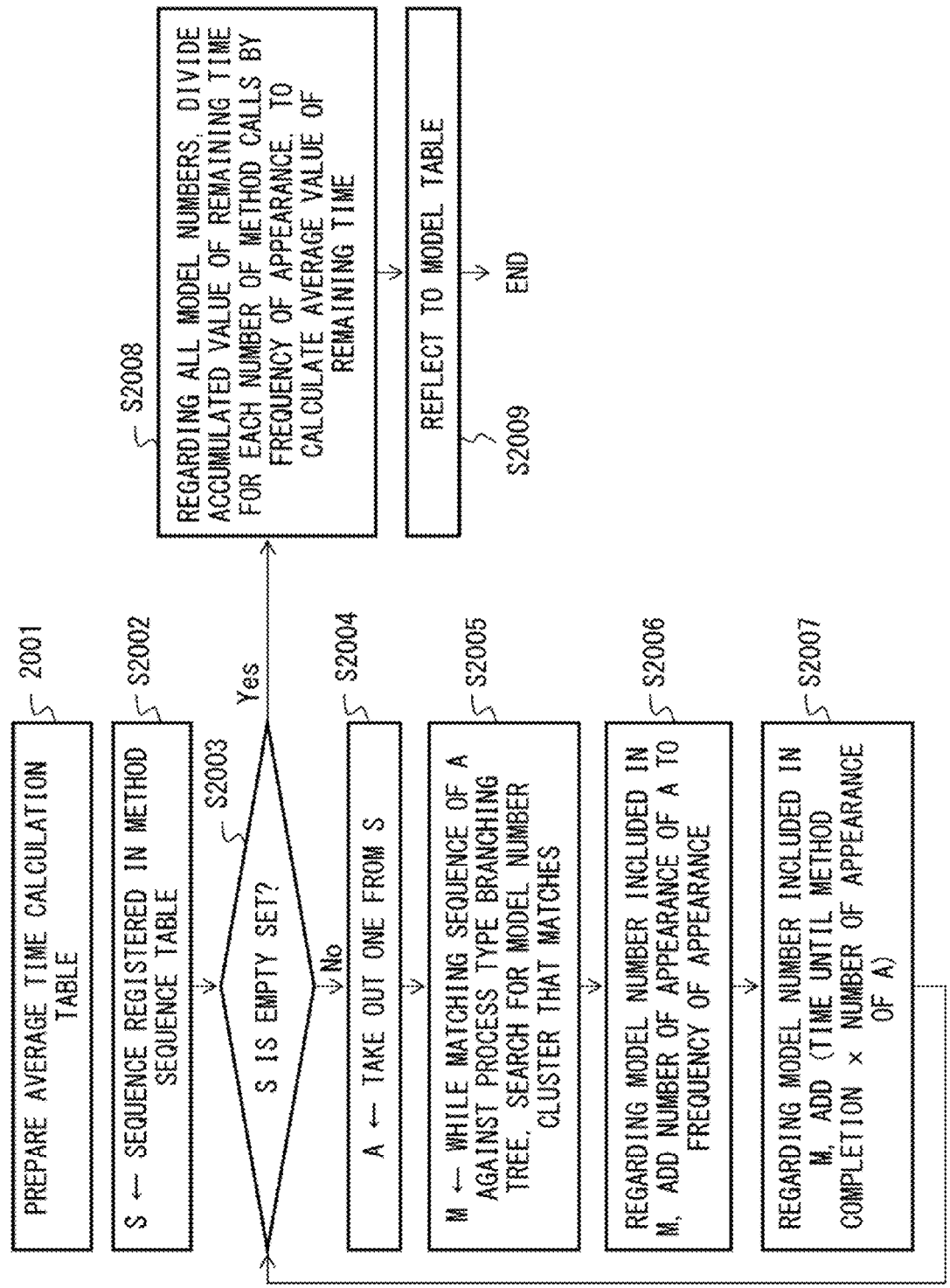
FIG. 20 is a flowchart illustrating the detail process in step S2-7 in FIG. 12.

FIG. 20 is a flowchart illustrating the detail process of S2-7 in FIG. 12 illustrating the calculation process of the model number 206 described above. The process is described using the illustration diagram FIG. 21 and FIG. 22.

First, on the memory, the average time calculation table 1901 in the initial state illustrated in FIG. 19(a) is generated (step S2001 in FIG. 20).

Next, in an array variable S on the memory, the character string of each method sequence obtained in the method sequence table 401 as in FIG. 4 is stored (step S2002 in FIG. 20).

Next, whether or not the array variable S has become an empty set or not is determined (step S2003).

If the array variable S has not become an empty set and the judgment in step S2003 is No, a character string of one method call sequence is taken out from the array variable S, and its content is stored in a variable A on the memory (step S2004). For example, from the array variable S, the character string of the method call sequence represented by 2101 in FIG. 21 in the method sequence table 401 is read out and stored in the variable A.

Next, the character string of the method call sequence stored in the variable A is checked against the model number on the process type branching tree 501 determined in step S2-6 in FIG. 12. As a result, a search for a model number group that matches the method call sequence of the variable A is performed, and the number sequence is stored in an array variable M on the memory (step S2005 in FIG. 20). In the example in FIG. 21, as a result of the process type branching tree 501 being checked with the method call sequence 2101, the model numbers 1, 2, 3 match.

Figure 21:
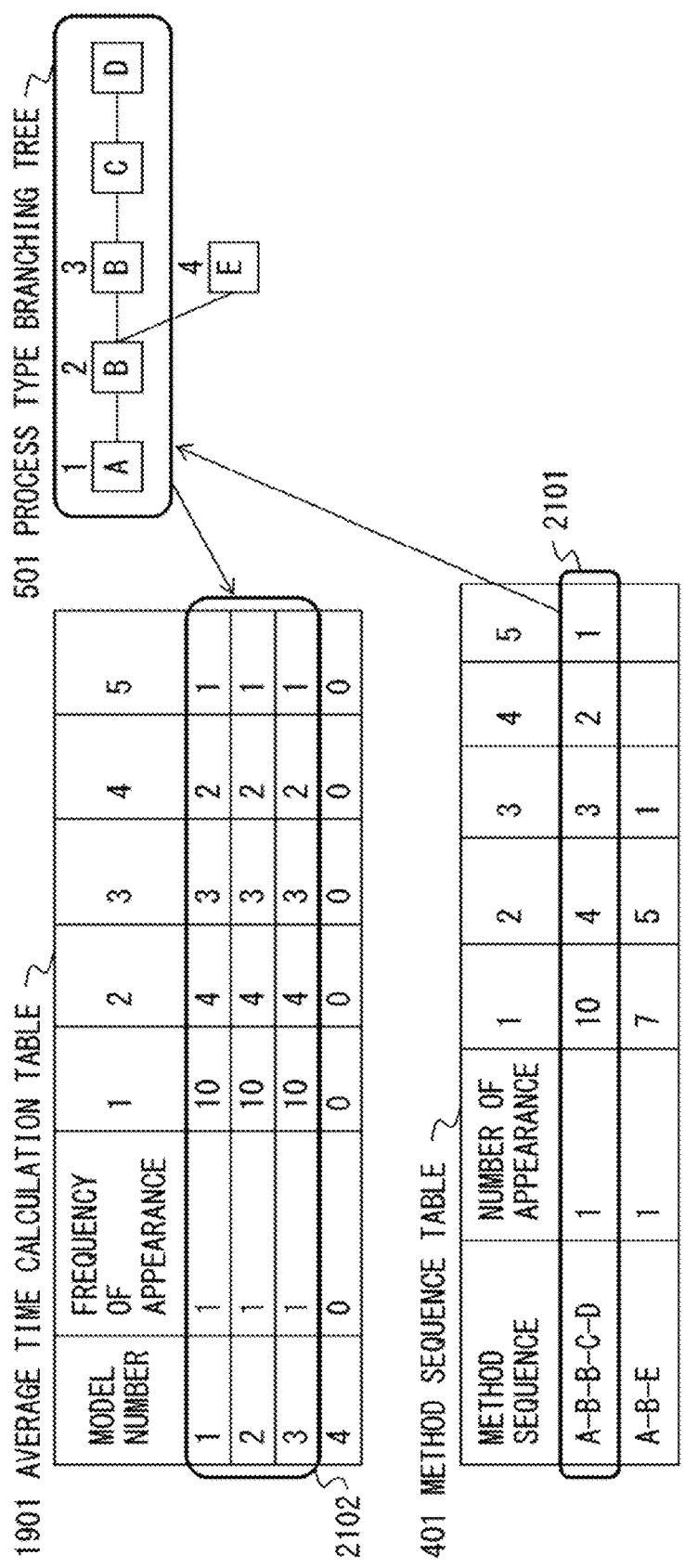
FIG. 21 is an illustration diagram (part 1) of the process in step S2-7 in FIG. 12.

Next, on the average time calculation table 1901, to the frequency of appearance item in each line corresponding to the model number, the value of the number of appearance of the line corresponding to the method call sequence of the variable A on the method sequence table 401 is added. In the example of FIG. 21, to each frequency of appearance item of the line corresponding to the model numbers 1, 2, 3 presented as 2102 in FIG. 21 on the average time calculation table 1901, the number of appearance=1 of the method call sequence 2101 is added (step S2006 in FIG. 20 is as described above).

Then, on the average time calculation table 1901, each of the following values is added to each number of method calls item of each line corresponding to each model number included in the array variable M. The value of each number of method calls item of the line corresponding to the method call sequence of the variable A on the method sequence table 401 is multiplied with the value of the number of appearance of each same line, and each result of the multiplication is added. In the example in FIG. 21, the value of each number of method call item "10" "4" "3" "2" "1" of the line corresponding to the method call sequence 2101 on the method sequence table 401 is respectively multiplied with the number of appearance=1. Then, each result of the multiplication "10" "4" "3" "2" "1" are added to the each number of method calls item of each line of the model numbers 1, 2, 3 presented as 2102 in FIG. 21.

After that, the process returns step S2003, and whether or not the array variable S has become an empty set or not is determined (step S2003). In the example of the method sequence table 401 in FIG. 4, in the array variable S, the method call sequence "A-B-E" is still left. As a result, the judgment in step S2003 becomes No, and the processes from step S2004 to S2007 are executed again. Its example is presented in FIG. 22. For example, from the array variable S, the character string of the method call sequence represented by 2201 in FIG. 22 in the method sequence table 401 is read out and stored in the variable A. Next, as a result of the process branching tree 501 checked with the method call sequence 2101, the model numbers 1, 2, 4 match. Next, to each frequency of appearance item of each line corresponding to the model number 1, 2, 4 presented as 2102 and 2103 in FIG. 22 on the average time calculation table 1901, the number of appearance of the method call sequence 2201=1 is added.

Next, the value of each number of method call item "1" "7" "5" "1" of the line corresponding to the method call sequence 2201 on the method sequence table 401 is respectively multiplied with the number of appearance=1. Then, each result of the multiplication "1" "7" "5" "1" are added to the each number of method calls item of each line of the model numbers 1, 2, 4 presented as 2202 and 2203 in FIG. 22. Then, the process returns step S2003, and whether or not the array variable S has become an empty set or not is judged.

In the example of the method sequence table 401, since no method call sequence is left in the array variable S, the judgment in step S2003 becomes Yes. As a result, for all the lines corresponding to all the model numbers on the average time calculation table 1901, the accumulated value of the remaining time for each number of method calls is divided by the frequency of appearance and the average value of the remaining time is calculated (step S2008). Then, the average value of each remaining time is reflected in the model table 206 in FIG. 8 (step S2009). It follows that from the average time calculation table 1901 in FIG. 8, the model table 206 in FIG. 8 is generated.

FIG. 23 is a flowchart illustrating the detail process of step S2-8 in FIG. 12. Here, as illustrated in FIG. 9, the transition relationship between model numbers is obtained for each method and written into the model number transition table 207 first, from the "Method name" item in the model table 206, all the method names are extracted, and the method names "A" "B" "E" are stored in the array variable M, in the example of model table 206 in FIG. 8.

Next, whether all the methods have been taken out from the array variable M and its content has become empty or not is judged (step S2302 in FIG. 23).

If there is any method name still left in the array variable M and the judgment in step S2302 is No, one method names is taken out from the array variable M and stored in a variable m on the memory (step S2303). In the example of the model table 206, the method name "A" is stored in the variable m for example.

Next, in the model table 206 in FIG. 8, each line in which the "Method name" item is equal to the method name in the variable m is selected. Then, in each selected line, a pair in the following transition relationship is generated (step S2304 in FIG. 23).

(value of the "immediately-before model number" item)->(value of the "model number" item)

For example, in the example of the model table 206 in FIG. 8, for the line of the model number=1 in which the value of the "Method name" item is "A", a pair "*->1" is generated. Meanwhile, "*" indicates the absence of the model number.

Then, on the memory, the model number transition table 207 is generated. Next, if there is no entry of the line corresponding to the method number in the variable m, the entry is generated and the method name in the variable m is stored in its "method" item. Then, in the "model number transition item" of the entry of the line, the transition relationship generated in step S2304 is stored (step S2305 in FIG. 23 is as described above). In the example of the model table 206 in FIG. 8, when the variable m=A, the entry of the line of the first line illustrated in FIG. 9 is generated.

After that, the process returns to step S2302, and whether or not the array variable M is an empty set or not is judged. In the example of the model table 206 in FIG. 8, at the stage where the method A has been processed, the methods B, E are still left in the array variable M. As a result, the judgment in step S2302 becomes No, and the series of processes from step S2303 to step S2305 are executed again, In the example of the model table in FIG. 8, the second method name "B" is stored in the variable m for example. Next, for each lines of the model number=2, 3 in which the value of the "Method number" item is "B", respective pairs "1->2" and "2->3" are generated. Then, on the model number transition table 207, the entry of the line of the second line illustrated in FIG. 9 is generated.

After that, the process returns to step S2302, and whether or not the array variable M is an empty set or not is judged. In the example of the model table 206 in FIG. 8, at the stage where the second method B has been processed, the method E is still left in the array variable M. As a result, the judgment in step S2302 becomes No, and the series of processes from step S2303 to step S2305 are executed again, In the example of the model table in FIG. 8, the third method name "E" is stored in the variable m for example. Next, for the line of the model number=4 in which the value of the "Method number" item is "E", a pair "2->4" is generated. Then, on the model number transition table 207, the entry of the line of the third line illustrated in FIG. 9 is generated.

FIG. 24 is a system diagram of the second embodiment, which operates on the server computer 102 in FIG. 1. In FIG. 24, the parts that have the same numbers as in the case of the system configuration of the first embodiment in FIG. 2 have the same function. The part in which the system configuration of the second embodiment in FIG. 24 differs from the system configuration of the first embodiment in FIG. 2 a number of method call count code insertion unit 2401.

The number of method call count code insertion unit 2401 further inserts, to the Web application code 209 to dynamically determine the process type, a code to count the number of method calls in the thread that is currently being executed. As a result, a Web application code 2402 by which the remaining time can be calculated is output.

As illustrated in the first embodiment, in the thread local variable table 302 kept corresponding to each thread on the memory, as illustrated in FIG. 3, other than the MOEDLID variable updated in the first embodiment, an NCALL variable is also included. The number of method call count code insertion unit 2401 operates so as to increment the NCALL value every time when a method is called.

Specifically, the number of method call count code insertion unit 2401 automatically generates and embeds a code to increment the NCALL value, to the top of the program code of each method in the Web application code 209 to dynamically determine the process type.

Figure 25:
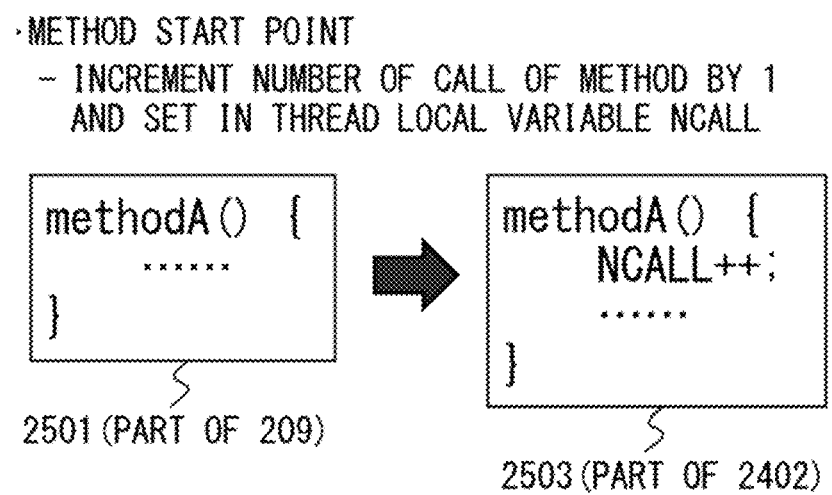
FIG. 25 is an illustration diagram of a number of method calls count code insertion unit in the second embodiment.

FIG. 25 is an illustration diagram of the number of method call count code insertion unit in the second embodiment. In FIG. 25, the program code 2501 of the method A for example is a part of the Web application code 209 to dynamically determine the process type generated in the first embodiment. The number of method call count code insertion unit 2401 embeds, in the program code 2501, a code "NCALL++;" to increment the NCALL value, to convert it into the program code 2502. Here, while "NCALL++;" expresses the number of the method for which insertion to the top of each program code is performed being called, it is not a local variable of the method but is a global variable of the method. The program code 2502 is output as the Web application code 2402 in FIG. 24 by which the remaining time can be calculated. When the Web application code 2402 by which the remaining time can be calculated is executed on the thread, according to the program code "NCALL++;", the NCALL value on the thread local variable table 302 in FIG. 3 is read out. Then, +1 is performed to the value, and the result is written back as the NCALL value on the thread local variable table 302.

Accordingly, on the thread, every time when the method is executed, the NCALL value on the thread local variable table 302 is incremented.

That is, in the system of the second embodiment in FIG. 24, with the Web application code 2402 by which the remaining time can be calculated being executed instead of the Web application code 201, the following process is realized. First, in the same manner as in the first embodiment, as the MOEDLID value on the thread local variable table 302, it becomes possible to judge the current process type in the corresponding thread. Furthermore, as the NCALL value on the thread local variable table 302, it becomes possible to judge the number of method calls at the present point of time in the corresponding thread.

As described above, on the thread local variable table 302 in FIG. 3 corresponding to each thread being executed, by using the NCALL value that is incremented according to the second embodiment and the MOEDLID value that is updated according to the first embodiment, it becomes possible to calculate the remaining time of the thread.

Figure 26:
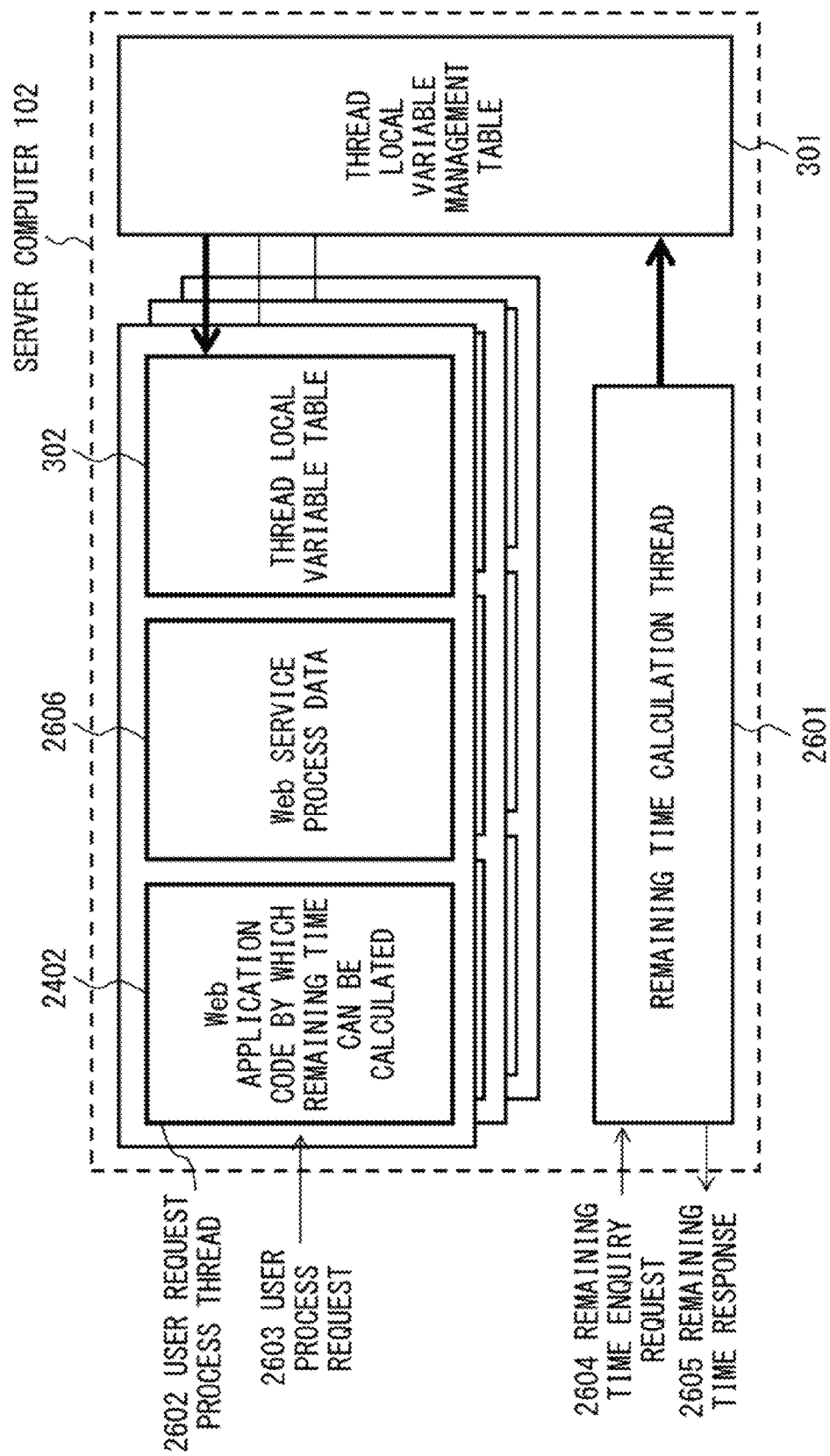
FIG. 26 is a system configuration diagram of the third embodiment.

FIG. 26 is a system configuration diagram of the third embodiment. The system is a system that is capable of responding with the remaining time to the enquiry request of the remaining time specifying a request ID from the client computer 101 in FIG. 1. The system responds with the remaining time using the process of the second embodiment (including the process of the first embodiment).

The system of the third embodiment operates on the server computer 102 in FIG. 1.

In FIG. 26, a user request process thread 2602 is a thread generated on the memory for each request ID, based on the request from the user. On the user request process thread 2602, a Web application code 2402 generated according to the second embodiment by which the remaining time can be calculated is executed, and a Web service process data 2606 being user data is referred to and updated from the application code. In addition, for each user request process thread 2602, the thread local variable table 302 in FIG. 3 described above in the first embodiment is secured. The thread local variable table 302 is referred to via the thread local variable management table 301 in FIG. 3 that manages the correspondence relationship of the request ID of each thread and the thread local variable table 302. One thread local variable table 302 is provided with respect to all the user request process threads 2602.

As described in the second embodiment, with the Web application code 2402 by which the remaining time can be calculated being executed on the tread, the MOEDLID value and NCALL value on the thread local variable table 302 are updated.

In FIG. 26, the remaining time calculation thread 2601 is generated on the memory when a remaining time enquiry request 2604 is received from the user with respect to the user request process thread 2602 that itself is currently executing. The remaining time calculation thread 2601 is executed as a Servlet program by Java program for example. The remaining time calculation thread 2601 accesses the thread local variable management table 301 in FIG. 3 based on the request ID included in the remaining time enquiry request 2604. Accordingly, the remaining time calculation thread 2601 accesses the thread local variable table 302 in the user request process thread 2602 corresponding to the remaining time enquiry request 2604, and calculates the remaining time and reply to the user with it as the remaining time response 2605. FIG. 27 is a flowchart illustrating the process of the remaining time calculation thread in the third embodiment.

First, the progress situation is identified. When the remaining time enquiry request 2604 comes in, based on the currently-ongoing request ID, the number of the method being called since the arrival of the request of the user process and the current process classification (model number) is read out from the thread local variable table 302 (step S2701 in FIG. 27).

Next, the remaining time is calculated. The remaining process time is calculated from the recent average process time regarding the remaining process, and the remaining time response 2605 is returned to the user (step S2702 in FIG. 27).

Figure 28:
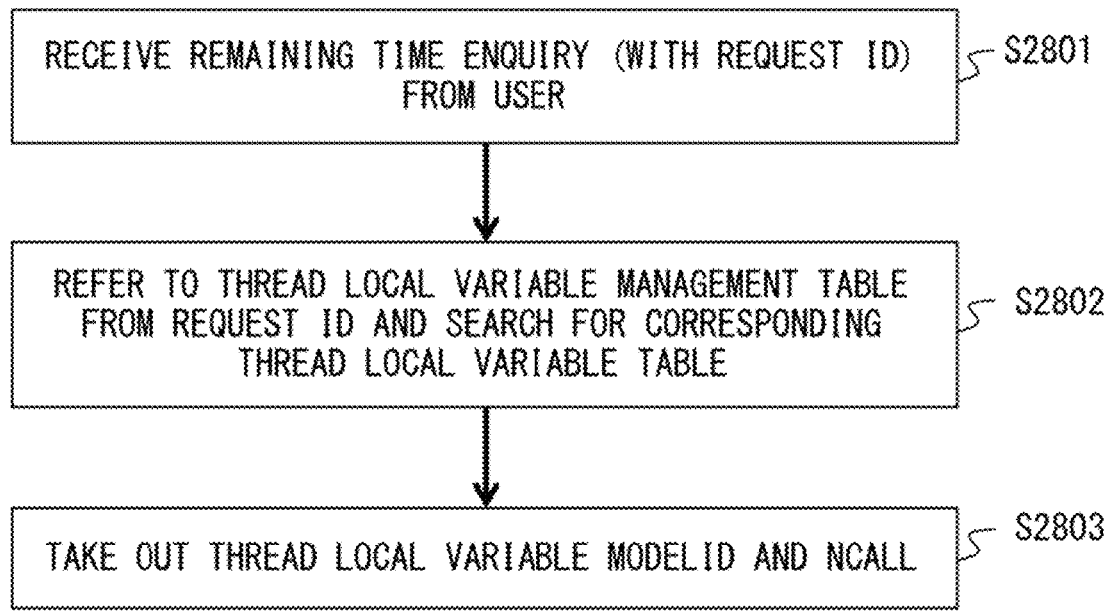
FIG. 28 is a flowchart illustrating the detail process in S2701 in FIG. 27.

FIG. 28 is a flowchart illustrating the detail process of step S2701 in FIG. 27.

First, the remaining time enquiry request 2604 is received from the user. This includes the request ID (step S2801 in FIG. 28).

Next, from the request ID, the thread local variable management table 301 in FIG. 3 is referred to, to search for the thread local variable table 302 in FIG. 3 (step S2802 in FIG. 28).

Next, from the thread local variable table 302 corresponding to the request ID, the MOEDLID value and the NCALL value is taken out (step S2803 in FIG. 28).

FIG. 29 is an illustration diagram of the process to calculate the remaining time based on the MOEDLID value and the NCALL value taken out from the thread local variable table 302 as described above. In the step S2702 in FIG. 27, in the model table 206 (FIG. 2 or FIG. 24) generated in the first or second embodiment, the following reference operation is performed based on the MOEDLID value and the NCALL value obtained in step S2803 in FIG. 28. The remaining time registered in the item of the number of method calls corresponding to the NCALL value, of the entry line of the model number corresponding to the MOEDLID value, is obtained and returned to the client computer 101 in FIG. 1 as the remaining time response 2605. For example, in the model table 206 illustrated in FIG. 9 (FIG. 8), it is assumed that MOEDLID value=4, NCALL value=3 are obtained. In this case, the remaining time=1 second correspond to the item of the number of method calls=3 of the entry line corresponding to the model number=4 on the model table 206 is obtained and returned to the client computer 101.

As described above, according to the third embodiment, it becomes possible to automatically obtain the process type and the number of method calls corresponding to the currently-executed thread as the MOEDLID value and the NCALL value, and to respond with an appropriate remaining time based on them.

Figure 30:
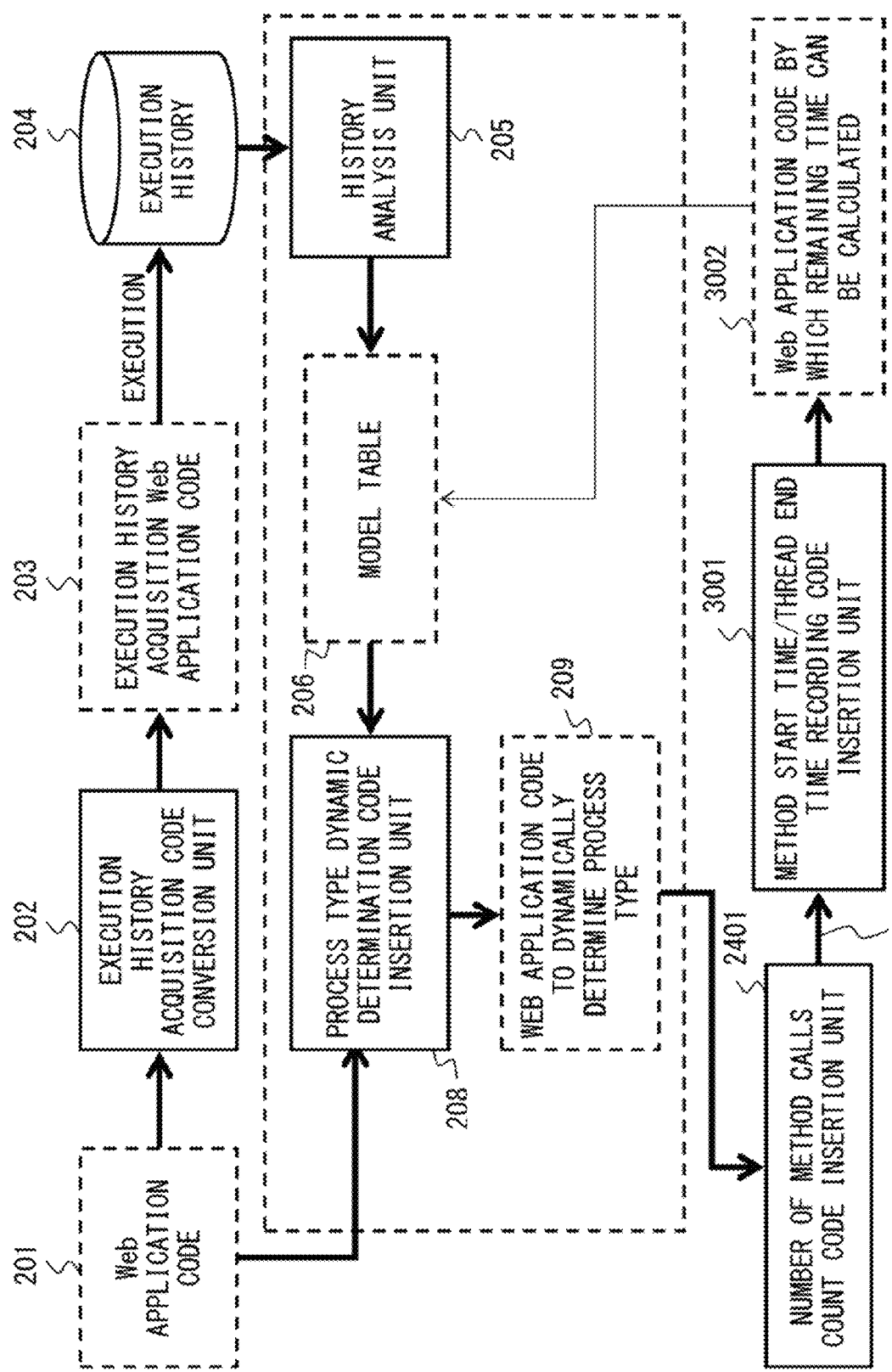
FIG. 30 is a system configuration diagram of the fourth embodiment.

FIG. 30 is a system configuration diagram of the fourth embodiment, which operates on the server computer 102 in FIG. 1. In FIG. 30, the parts that have the same numbers as in the case of the system configuration of the second embodiment in FIG. 24 have the same function. The part in which the system configuration of the fourth embodiment in FIG. 30 differs from the system configuration of the second embodiment in FIG. 24 a method start time/thread end time recording code insertion unit 3001.

As illustrated in FIG. 3, in the thread local variable table 302 of each thread referred to from the thread local variable management table 301, an ENDTIME variable and a METHOD_HISTORY array variable are recorded. The ENDTIME variable is a variable that records the execution end time of the thread corresponding to the thread local variable table 302 in which it is included, as the ENDTIME value. The METHOD_HISTORY array variable is an array variable that records each execution start time string of a series of methods that are executed in the thread.

Then, the method start time/thread end time recording code insertion unit 3001 in the fourth embodiment executes a process as described below as an injection process of a code for saving the method start-up history for remaining time update.

First, the method start time/thread end time recording code insertion unit 3001 automatically generates a program code to record the execution start time in the METHOD_HISTORY array variable in the thread local variable table 302. Then, the automatically generated program code is embedded in the program code of all the methods in the Web application code 2402 by which the remaining time can be calculated generated by the number of method call count code insertion unit 2401.

In addition, the method start time/thread end time recording code insertion unit 3001 automatically generates two program codes as described below. The first program code records the execution end time of the thread in the ENDTIME variable in the thread local variable table 302. Th second program code calculates the remaining time of the process for each method executed in the thread from the METHOD_HISTORY array value and the ENDTIME value recorded in the thread local variable table 302, and updates the model table 206 based on the calculation. Then, the first and second program codes are embedded in the program code of the method executed last at the time when execution of the thread ends in the Web application code 2402 by which the remaining time can be calculated generated by the number of method call count code insertion unit 2401.

Figure 31:
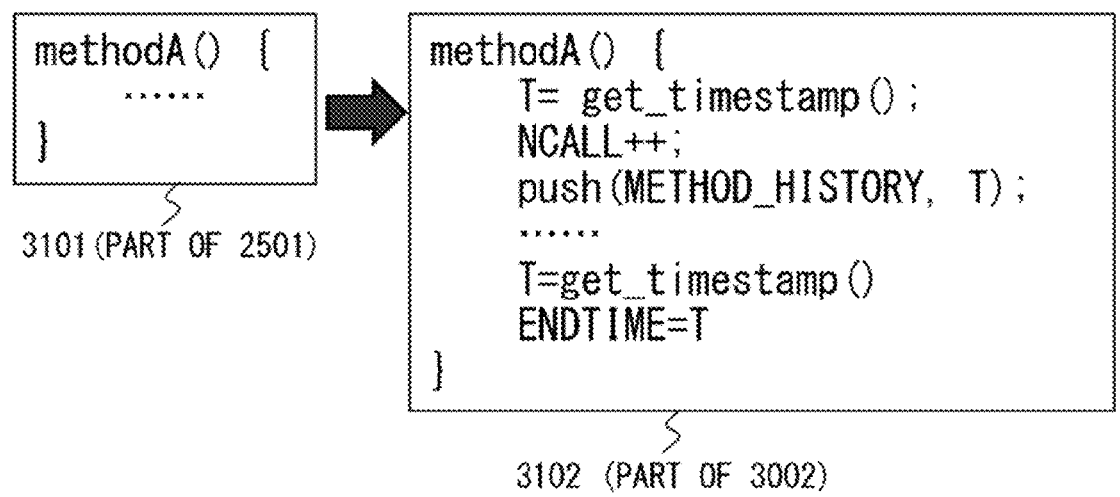
FIG. 31 is an illustration diagram of an injection process of a method start time recording code for remaining time update in the fourth embodiment.

FIG. 31 is an illustration diagram of an injection process of a method start time recording code executed by the method start time/thread end time recording code insertion unit 3001. In FIG. 31, for example, the program code 3101 of the method A is a part of the Web application code 2402 (see FIG. 24, FIG. 30) by which the remaining time can be calculated, generated in the second embodiment.

In the injection process of a method start time recording code, in the program code 3101, in the top part of the method call, codes "T=get_timestamp( )" and "push(METHO-D_HISTORY, T);" are embedded. In addition, in the tail part of the method, codes "T=get_timestamp( );" and "ENDTIME=T;" are embedded. Meanwhile, the code "NCALL++;" is a code inserted by the umber of method call count code insertion unit 2402 (FIG. 30). This was explained in the second embodiment (see FIG. 25).

The code "T=get_timestamp( );" embedded in the top part of the method executes the function get_timestamp( ) to calculate the current time at the point of time of the start of the method A for example, and stores the current time obtained as a result in a variable T on the memory. Meanwhile, the code "push(METHOD_HISTORY, T);" adds the value of the variable T as a new array element to the tail of the METHO-D_HISTORY array variable (see FIG. 3) in the thread local variable table 302 corresponding to the current thread. By these two codes, the execution start time of the method A for example is recorded as the METHOD_HISTORY array variable value.

The code "T=get_timestamp( );" embedded in the tail part of the method executes the function get_timestamp( ) to calculate the current time at the point of time of the end of the method A for example, and stores the current time obtained as a result in a variable T on the memory. Meanwhile, the code "ENDTIME=T;" stores the value of the variable T in the ENDTIME variable (see FIG. 3) in the thread local variable table 302 corresponding to the current thread. By these two codes, the end time of the method A=the end time of the thread at the present point of time for example is recorded as the METHOD_HISTORY array variable value.

As described above, the method start time/thread end time recording code insertion unit 3001 converts the program code 3101 of the method A into a program code 3102 for example. Then, the program code 3102 obtained by the conversion as described above is output as a part of a new Web application code 3002 (FIG. 30) by which the remaining time can be calculated.

FIG. 32 is an illustration diagram of an injection process of a thread end time recording code, executed by the method start time/thread end time recording code insertion unit 3001. In FIG. 32, the program code 3201 of the "doGet( )" method in the same manner as in FIG. 10 for example is a part of the Web application code 2402 (see FIG. 24, FIG. 30) by which the remaining time can be calculated, generated in the second embodiment. Meanwhile, as described in FIG. 10, it may be "doPost( )" method instead of "doGet( )" method. These methods are the methods that are executed first when a request having a request ID is received from the client computer 101 in FIG. 1 as described in FIG. 10.

In the injection process of a method start time recording code, in the tail part of the program code 3201, a code is embedded to add the value of the ENDTIME variable in the thread local variable table 302 as a new element of the METHOD_HISTORY array variable as well. In addition, in the tail part of the program code 3201, a code is embedded to reflect the information of the METHOD_HISTORY array variable in the thread local variable table 302 to the model table 206.

As described above, the method start time/thread end time recording code insertion unit 3001 converts the program code 3201 of the "doGet( )" method into the program code 3202. Then, the program code 3202 obtained by the conversion as described above is output as a part of the new Web application code 3002 (FIG. 30) by which the remaining time can be calculated.

Meanwhile, the code to generate the request ID embedded in the top part of the program code 3201 and the code to secure the thread local variable area are codes inserted by the process type dynamic determination code insertion unit 208 (FIG. 30). The code to release the thread local variable area embedded in the tail part of the program code 3201 is also a code inserted by the process type dynamic determination code insertion unit 208. This was explained in the first embodiment (see FIG. 10).

FIG. 33 and FIG. 34 are illustration diagrams of a process to reflect information of METHOD_HISTORY executed by the program code 3202 in FIG. 32 to the model table 206.

In this process, the average time calculation table 1901 generated on the memory in the same manner as described in FIG. 19 is used. First, in the registration content of the model table 206 obtained on the memory as illustrated in FIG. 8 for example, data of the model number, the Method name, the average remaining time for each number of method calls in the each line of each model number is copied to average time calculation table 1901. Then, the value of the frequency of appearance item of each line corresponding to each model in the average time calculation table 1901 is set to 1.

Next, it is assumed that as a result of the execution of each method in the current thread, for example the method call sequence "A-B-B-C-D" is executed. In addition, it is assumed that the MOEDLID value in the thread local variable table 302 (FIG. 3) became the value 3 corresponding to the model number of the important call executed last (third). Further, it is assumed that by the program code 3102 in FIG. 31, as the METHOD_HISTORY array value in the thread local variable table 302, "100000" "100008" "100015" "100023" "100025" were obtained. "100000" is the execution start time of the method A executed first. "100008" is the execution start time of the method B executed second. "100015" is the execution start time of the method B executed third. "100023" is the execution start time of the method C executed fourth. "100025" is the execution start time of the method D executed last. In addition, it is assumed that by the program code 3102 in FIG. 32, "100030" for example was obtained as the last array value of METHOD_HISTORY. This "100030" is the execution end time of the method D, that is, the execution end time of the thread obtained as the ENDTIME value in the thread local variable table 302 at the point of time when the method D is executed last.

Next, from the end time "100030" obtained as the METHOD_HISTORY array value, each execution start time of each method "100000" "100008" "100015" "100023" "100025" are subtracted. Accordingly, the remaining time at the time of the execution start of each method is calculated as "30" "22" "15" "7" "5" seconds.

Next, each method name of the method calls sequence executed currently is matched against the model number on the process type branching tree 501 that has been obtained as in FIG. 7. As a result, a search for a model number cluster that matches the method call sequence that is executed currently is performed. In the example of FIG. 34, as a result of the method call sequence "A-B-B-C-D" being matched against each model number on the process type branching tree 501 in FIG. 7, and the model numbers 1, 2, 3 match.

Next, on the average time calculation table 1901, the value of the frequency of appearance item of each line corresponding to each of the above matched model number is incremented respectively by +1. In the example of FIG. 34, the value of each frequency of appearance item of each line corresponding to each of the above matched model number 1, 2, 3 all becomes 2.

Then, on the average time calculation table 1901, to each average remaining for each number of method calls item of each line corresponding to each of the above matched model numbers, the remaining time for each method calculated currently is added. For example, to each average remaining time "8.5" "4.5" "2" "1" "0.5" (FIG. 30), the remaining time "30" "22" "15" "7" "5" (FIG. 34) are added. As a result, the added value of the remaining time for each number of method calls corresponding to the model number=1 on the average time calculation table 1901 becomes "38.5" "26.5" "17" "8" "5.5" as illustrated in FIG. 34. In the case of the model number=2, the calculation result becomes the same as in the case of the model number=1. Further, to each average remaining time "10" "4" "3" "2" "1" (FIG. 30), the remaining time "30" "22" "15" "7" "5" (FIG. 34) are added. As a result, the added value of the remaining time for each number of method calls item corresponding to the model number=~1 on the average time calculation table 1901 becomes "40" "26" "18" "9" "6" as illustrated in FIG. 34.

After the content of the average time calculation table 1901 is updated as described above, in the lines corresponding to all the model numbers on the average time calculation table 1901, the accumulated value of the remaining time for each number of method calls is divided by the frequency of appearance to calculate the average value of the remaining time. Then, the average value of the remaining time for each number of method calls of each line obtained on the average time calculation table 1901 is written back to each number of method calls item of each line in the model table 206.

As described above, according to the fourth embodiment, it becomes possible to reflect information of the remaining time to the end of the thread for each method newly executed to the model table 206.

Figure 35:
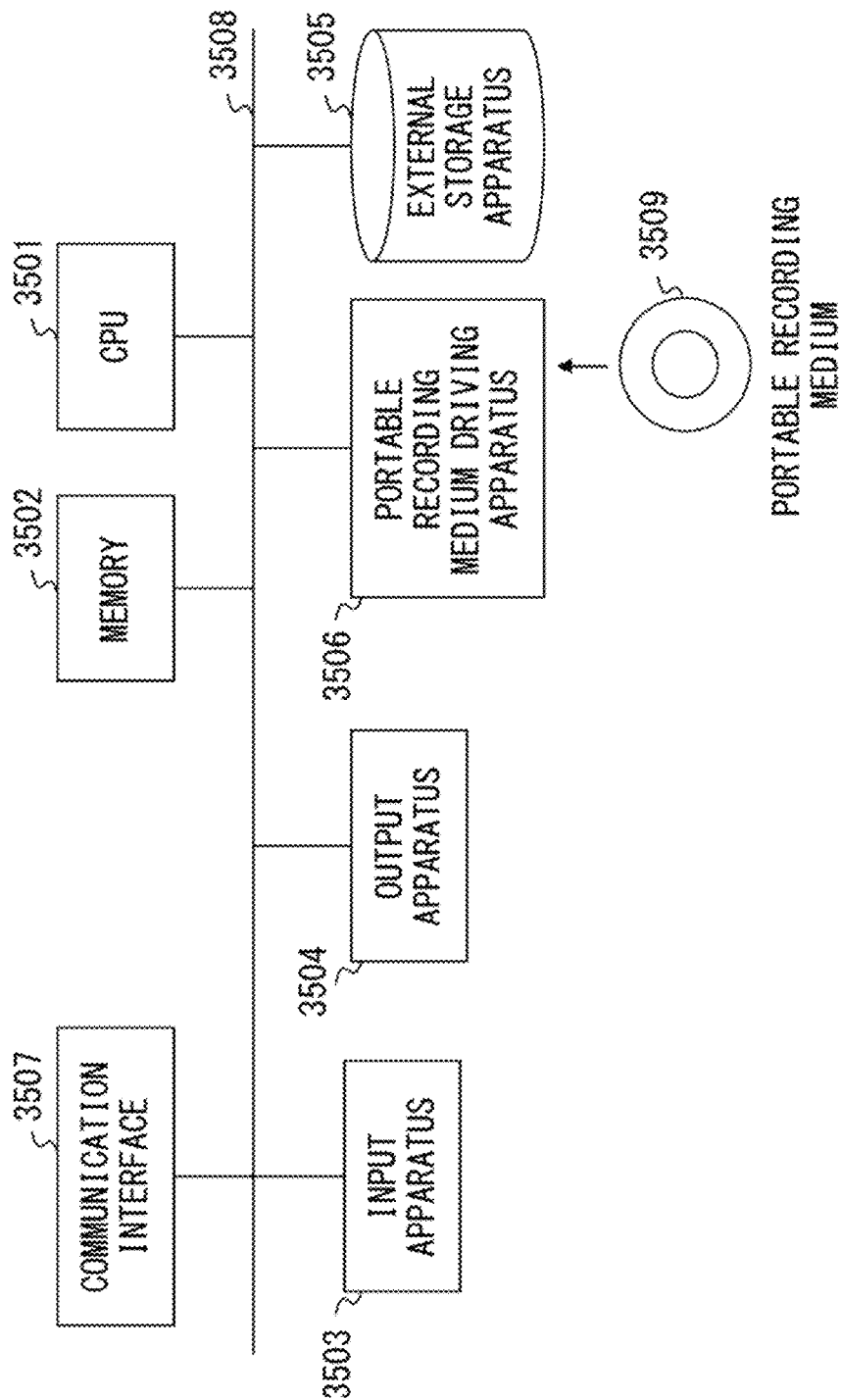
FIG. 35 is a configuration diagram of hardware that is capable of realizing the system of the embodiments 1-4.

FIG. 35 is a diagram illustrating an example of the hardware configuration of the computer that is capable of realizing the system described above as a software process.

The computer illustrated in FIG. 35 has a CPU 3501, a memory 3502, an input apparatus 3503, an output apparatus 3504, an external storage apparatus 3505, a portable recording medium driving apparatus 3506 to which a portable recording medium 3509 is inserted, and a communication interface 3507, and has a configuration in which these are connected to each other by a bus 3508. The configuration illustrated in the drawing is an example of a computer that is capable of realizing the system described above, and such a computer is not limited to this configuration.

The CPU 3501 performs the control of the whole computer. The memory 3502 is a memory such as a RAM that temporarily stores a program or data stored in the external storage apparatus 3505 (or the portable recording medium 3509) upon execution of a program, data update and the like. The CUP 3501 performs the overall control by reading out and executing the program onto the memory 3502.

The input/output apparatus 3503 detects an input operation by the user by a keyboard, a mouse and the like, sends notification of the detection result to the CPU 3501, and outputs data sent by the control by the CPU 3501 to a display apparatus and a printing apparatus.

The external storage apparatus 3505 is a hard disk storage apparatus for example. It is used mainly for saving various data and programs.

The portable recording medium driving apparatus 3506 accommodates a portable recording medium 3509 such as an optical disk, SDRAM, compact flash and the like, and has an auxiliary role for the external storage apparatus 3505.

The communication interface 3507 is an apparatus to connect the communication line of a LAN (local area network) or a WAN (wide area network) for example.

The system according to the first-fourth embodiments is realized with the CPU 3501 executing a program having the functions realized in the flowcharts in FIG. 12, FIG. 16, FIG. 17, FIG. 20, FIG. 23, FIG. 27, FIG. 28 and the like. The program may be recorded in the external storage apparatus 3505 and the portable recording medium 3409 and distributed, or may be obtained from a network by the network connection apparatus 3507.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. A code conversion method of an application code, the code conversion method comprising:
obtaining, by a processor, from an execution history of the application code executed in response to a request, method call sequences classifying, for each of the request, a series of sequences of a method call included in the application code;
comparing, by the processor, method calls for each number of calls among the respective method call sequences, putting, from a top method call in the respective method call sequences, common method calls together as a node, making uncommon method calls into a node, and generating a process type branching tree being tree-structure data from the nodes;

marking, by the processor, a branched node among respective nodes constituting the process type branching tree as an important call to confirm a method executing process type of the application code, traversing the respective nodes along the process type branching tree from the respective branched nodes marked as the important calls toward a start node direction, and further marking, as the important call, the start node and a node of a same method as the branched node; the important call and the start node are further marked as important calls;

generating, by the processor, a code based on the process type branching tree and the methods of the nodes marked as the important calls; and inserting, by the processor, the generated code to the application code.

2. The code conversion method according to claim 1, further comprising inserting to the application code a code to judge a current number of method calls.

3. The code conversion method according to claim 1, further comprising determining the method executing process type of the application code based on the generated code inserted in the application code.

4. A request remaining time response method comprising:
obtaining, by a processor, an execution history of an application code executed in response to a request for each of the requests;
obtaining, by the processor, from the execution history, method call sequences classifying, for each of the request, a series of sequences of a method call included in the application code;
obtaining, by the processor, a time from a start of a method to a completion of a thread including the method as a remaining time for each of the requests;
counting, by the processor, a number of appearance of the method call sequence and obtaining an average time of the remaining time;
generating, by the processor, a process branching tree based on the method call sequence;
marking, by the processor, a branch node among respective nodes constituting the process type branching tree as an important call to confirm a method executing process type of the application code, traversing, by the processor, the respective nodes along the process type branching tree from the respective branched nodes marked as the important calls toward a start node direction, and further marking, by the processor, as the important call, a node of a same method as the branched;
assigning, by the processor, a model number as an identification information to each of methods called by the important call in the process type branching tree and registering the average time in a model table;
generating, by the processor, a model number transition table for each of the methods based on the process type branching tree;
inserting, by the processor, to the application code a process type judgment code which is generated based on the model number transition table;
inserting, by the processor, to the application code a code to count a number of method calls and
obtaining, by the processor, a remaining time for each method executing process type from the average time in the model table based on the method executing process type and the number of method calls.

5. The request remaining time response method according to claim 4, further comprising generating a code that updates and records an execution start time and an execution end time of the method and embedding the generated code in the application code.

6. A code conversion apparatus comprising a computer which includes a processor that:
obtains, from an execution history of an application code executed in response to a request, method call sequences classifying, for each of the request, a series of sequences of a method call included in the application code;
compares method calls for each number of calls among the respective method call sequences, puts, from a top method call in the respective method call sequences, common method calls together as a node, makes uncommon method calls into a node, and generates a process type branching tree being tree-structure data from the nodes;
marks a branched node among respective nodes constituting the process type branching tree as an important call to confirm a method executing process type of the application code, traverses the respective nodes along the process type branching tree from the respective branched nodes marked as the important calls toward a start node direction, and further marks, as the important call, the start node and a node of a same method as the branched node;
generates a code based on the process type branching tree and the methods of the nodes marked as the important calls; and
inserts the generated code to the application code.

7. A computer readable, non-transitory storage medium storing a code conversion program to make a computer execute processes comprising:
obtaining, from an execution history of an application code executed in response to a request, method call sequences classifying, for each of the request, a series of sequences of a method call included in the application code;
comparing method calls for each number of calls among the respective method call sequences, putting, from a top method call in the respective method call sequences, common method calls together as a node, making uncommon method calls into a node, and generating a process type branching tree being tree-structure data from the nodes;
marking a branched node among respective nodes constituting the process type branching tree as an important call to confirm a method executing process type of the application code, traversing the respective nodes along the process type branching tree from the respective branched nodes marked as the important calls toward a start node direction, and further marking, as the important call, the start node and a node of a same method as the branched node;
generating a code based on the process type branching tree and the methods of the nodes marked as the important calls; and
inserting the generated code to the application code.

8. A request remaining time response apparatus comprising a computer which includes a processor that:
obtains an execution history of an application code executed in response to a request for each of the requests;
obtains, from the execution history, method call sequences classifying, for each of the request, a series of sequences of a method call included in the application code;

obtains a time from a start of a method to a completion of a thread including the method as a remaining time for each of the requests;

counts a number of appearance of the method call sequence and obtains an average time of the remaining time;

generates a process branching tree based on the method call sequence;

marks a branch node among respective nodes constituting the process type branching tree as an important call to confirm a method executing process type of the application code, traverses the respective nodes along the process type branching tree from the respective branched nodes marked as the important calls toward a start node direction, and further marks, as the important call, a node of a same method as the branched node;

assigns a model number as an identification information to each of methods called by the important call in the process type branching tree and registers the average time in a model table;

generates a model number transition table for each of the methods the process type branching tree;

inserts to the application code a process type judgment code which is generated based on the model number transition table;

inserts to the application code a code to count a number of method calls; and obtains a remaining time for each method executing process type from the average time in the model table based on the method executing process type and the number of method calls.

9. A computer readable, non-transitory storage medium storing a request remaining time response program to make a computer execute processes comprising:

obtaining an execution history of an application code executed in response to a request for each of the requests;

obtaining, from the execution history, method call sequences classifying, for each of the request, a series of sequences of a method call included in the application code;

obtaining a time from a start of a method to a completion of a thread including the method as a remaining time for each of the requests;

counting a number of appearance of the method call sequence and obtains an average time of the remaining time;

generating a process branching tree based on the method call sequence;

marking a branch node among respective nodes constituting the process type branching tree as an important call to confirm a method executing process type of the application code, traversing the respective nodes along the process type branching tree from the respective branched nodes marked as the important calls toward a start node direction, and further marking, as the important call, a node of a same method as the branched node;

assigning a model number as an identification information to each of methods called by the important call in the process type branching tree and registering the average time in a model table;

generating a model number transition table for each of the methods based on the process type branching tree;

inserting to the application code a process type judgment code which is generated based on the model number transition table;

inserts to the application code a code to count a number of method calls; and obtaining a remaining time for each method executing process type from the average time in the model table based on the method executing process type and the number of method calls.

* * * * *